United States Patent [19]

Bright

[11] Patent Number: 5,164,986
[45] Date of Patent: Nov. 17, 1992

[54] FORMATION OF REKEY MESSAGES IN A COMMUNICATION SYSTEM

[75] Inventor: Michael W. Bright, Arlington Heights, Ill.

[73] Assignee: Motorola, Inc., Schaumburg, Ill.

[21] Appl. No.: 662,582

[22] Filed: Feb. 27, 1991

[51] Int. Cl.⁵ .......................... H04L 9/14; H04L 9/08
[52] U.S. Cl. ........................................ 380/21; 380/43; 380/49
[58] Field of Search .................. 380/21, 43, 49, 50

[56] References Cited

U.S. PATENT DOCUMENTS

| | | | |
|---|---|---|---|
| 3,749,845 | 7/1973 | Fraser | 370/80 |
| 4,228,321 | 10/1980 | Flanagan | 380/21 |
| 4,440,976 | 4/1984 | Bocci et al. | 380/1 |
| 4,549,308 | 10/1985 | LoPinto | 380/21 |
| 4,578,531 | 3/1986 | Everhart et al. | 380/21 |
| 4,605,820 | 8/1986 | Campbell, Jr. | 380/24 |
| 4,771,458 | 9/1988 | Citta et al. | 380/21 X |
| 4,876,716 | 10/1989 | Okamoto | 380/21 |
| 4,882,751 | 11/1989 | Kotzin et al. | 380/9 |
| 4,912,762 | 3/1990 | Lee et al. | 380/24 |
| 4,927,789 | 5/1990 | Shirley, Jr. et al. | 455/67 |
| 4,965,804 | 10/1990 | Trbovich et al. | 380/21 |
| 4,993,067 | 2/1991 | Leopold | 380/21 |
| 5,048,087 | 9/1991 | Trbovich et al. | 380/43 |

Primary Examiner—Bernarr E. Gregory
Attorney, Agent, or Firm—Susan L. Lukasik; Steven G. Parmelee

[57] ABSTRACT

Formation and sending of rekeying messages (305, 415, 515, and 605) in an encrypted communication system with over-the-channel rekeying of communication units is performed by a KMC, key management controller (101). The KMC (101) forms messages to provide new keys (1541), zeroization information (1549), and key indexing information (1543) to communication units (107), and to provide keyloader upload data (1563). Acknowledgments and rekey requests are also handled between the KMC (101) and communication units (107).

30 Claims, 14 Drawing Sheets

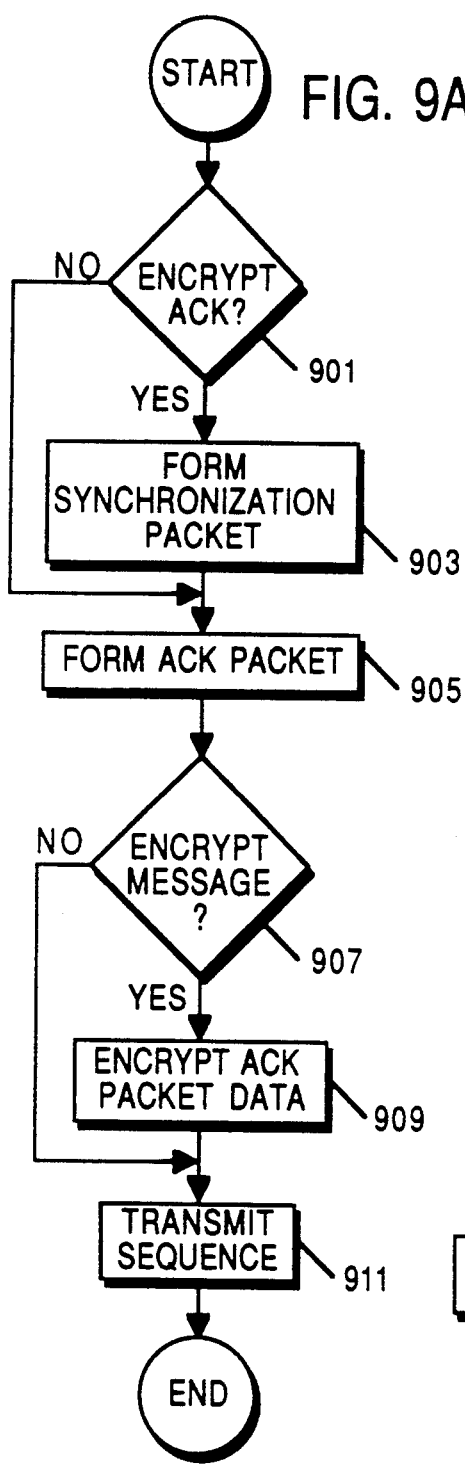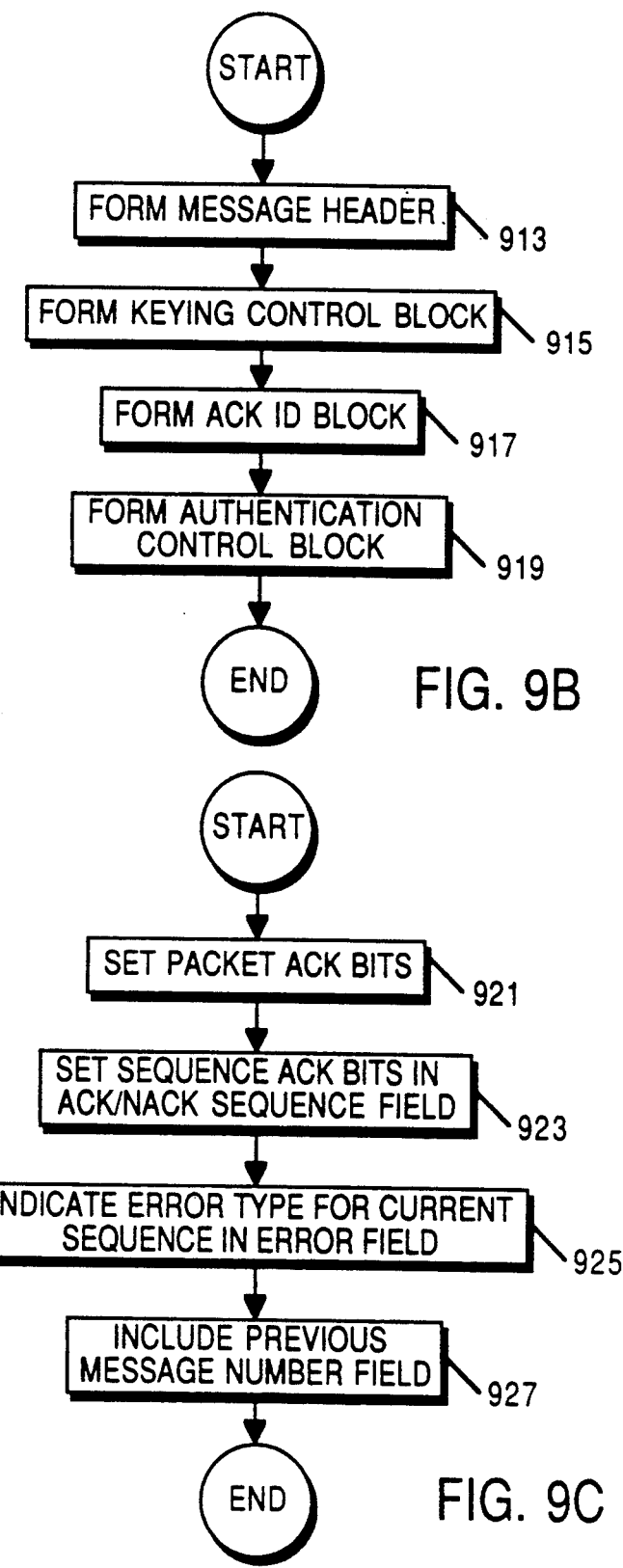
FIG. 9A / FIG. 9B / FIG. 9C

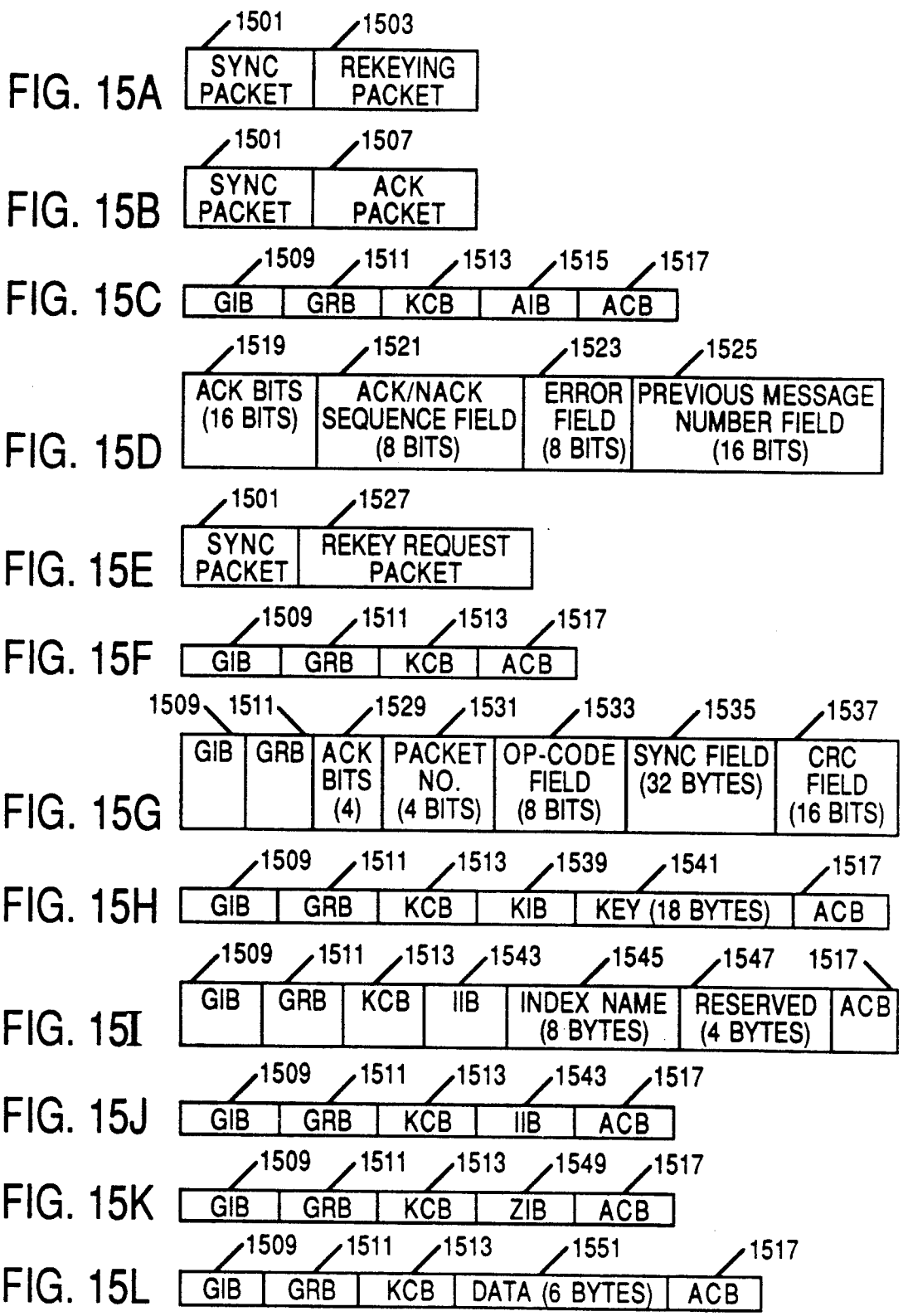

5,164,986

FORMATION OF REKEY MESSAGES IN A COMMUNICATION SYSTEM

FIELD OF THE INVENTION

This invention relates to encrypted communication systems. More particularly, this invention relates to key management in an encrypted communication system.

Reference is made to U.S. patent application Ser. No. 07/662,581, titled "Group Rekey in a Communication System" which may contain related material. Reference is also made to U.S. patent application Ser. No. 07,661,921, titled "Authentication of Rekey Messages in a Communication System" which may also contain related material. Reference is additionally made to U.S. patent application Ser. No. 07/661,748, titled "Key Distribution Communication System" which may also contain related material. All three U.S. patent applications were filed on Feb. 27, 1991 on behalf of Michael W. Bright, with the same assignee as the present invention.

BACKGROUND OF THE INVENTION

Encrypted voice and data systems are well known. Many of these systems provide secure communication between two or more users by sharing one piece of information between the users, which permits only those users knowing it to properly decrypt the message. This piece of information is known as the encryption key variable, or key for short. Loading this key into the actual encryption device in the secure communication unit is a basic requirement that allows secure communication to occur. To retain security over a long period of time, the keys are changed periodically, typically weekly or monthly.

Loading new keys, called rekeying, can be done in various ways. Over-the-channel rekeying is achieved by transmitting the encrypted keys from a central keyloading site to the units in the subscriber group over a typical secure channel. Manual rekeying is accomplished by connecting a cable from a hand-held keyloading device (also called a key variable loader, or keyloader for short) to the secure unit and downloading the keys from the keyloader into the communication unit by pressing the appropriate buttons on the keyloader. Over-the-channel rekeying takes a few seconds, and the process involved in manual keyloading, including locating the unit, connecting the loader, etc., takes much longer.

It is evident that use of an over-the-channel rekeying system is a big time-saver and a security improvement when rekeying a large system. As systems grow larger, with thousands of subscriber units in one system, the need for multiple keys becomes evident. In secure RF trunked systems, such as the system described in U.S. Pat. No. 4,882,751, it is often likely that different groups within a large system require their own encryption key or keys, possibly to increase internal security or to minimize the number of times it is necessary to reload keys over a period of time.

In over-the-channel rekeying systems, a time exists when some communication units have the new set of keys and the remaining units from the same group have the old set of keys, preventing them from secure communication with each other. This happens because a communication unit must be powered-up and must be within the RF range of the system to be rekeyed. A rekeying method is needed that can rekey all communication units, especially if they were not powered-up or in the system's RF range when the initial rekeying message occurred.

With the continually increasing size of systems and the growing need for system security, it is apparent that an approach to key management with an over-the-channel protocol that handles multiple keys is essential. This protocol must provide rekeying for all communication units, even if they were not powered-up or in the system's RF range during the original rekeying time.

SUMMARY OF THE INVENTION

The invention encompasses a method of and apparatus for rekeying at least one communication unit in a communication system. A rekeying message is formed with a rekeying packet comprising: (a) an acknowledgment field, (b) a message number field, (c) a destination/source field, (d) an operation-code field, and (e) an address field. The rekeying message is then transmitted to the at least one communication unit.

BRIEF DESCRIPTION OF THE DRAWINGS

FIG. 9A is a flowchart showing formation of an acknowledgment message in accordance with the invention.

FIG. 9B is a flowchart showing formation of an acknowledgment packet in accordance with the invention.

FIG. 9C is a flowchart showing formation of an acknowledgment ID block in accordance with the invention.

FIG. 15A is a bit field representation of a rekeying message in accordance with the invention.

FIG. 15B is a bit field representation of an acknowledgment message in accordance with the invention.

FIG. 15C is a bit field representation of an acknowledgment packet in accordance with the invention.

FIG. 15D is a bit field representation of an acknowledgment ID block in accordance with the invention.

FIG. 15E is a bit field representation of a rekey request message in accordance with the invention.

FIG. 15F is a bit field representation of a rekey request packet and rekeying packet with command data in accordance with the invention.

FIG. 15G is a bit field representation of a synchronization packet in accordance with the invention.

FIG. 15H is a bit field representation of a rekeying packet with key data in accordance with the invention.

FIG. 15I is a bit field representation of a rekeying packet with index name data in accordance with the invention.

FIG. 15J is a bit field representation of a rekeying packet with index change data in accordance with the invention.

FIG. 15K is a bit field representation of a rekeying packet with zeroization data in accordance with the invention.

FIG. 15L is a bit field representation of a rekeying packet with extended command data in accordance with the invention.

DESCRIPTION OF A PREFERRED EMBODIMENT

The following describes a method and apparatus for over-the-channel key management in a secure communication system. This key management communication includes multiple-key ability and the ability to rekey a communication unit that was not powered-up or in the RF range of the key management communications during the original rekeying time.

In the preferred embodiment, the over-the-channel rekey system includes a Key Management Controller (KMC) and communication units. The KMC includes a database that records communication unit IDs (identifications), keys, and which units have-need what keys, and is a central control point for distributing this data over the communication channel. See FIG. 16 for further information on KMC hardware. The communication units include a mobile radio, such as a Syntor X 9000 with Over the Air Rekeying (OTAR)/multikey option, a portable radio, such as a Systems Saber with Over the Air Rekeying (OTAR)/multikey option, a key variable loader (KVL), such as a T3011CX, and a Console Interface Unit (CIU) with Over the Air Rekeying (OTAR)/multikey option. All are available from Motorola, Inc.

Figure 1:
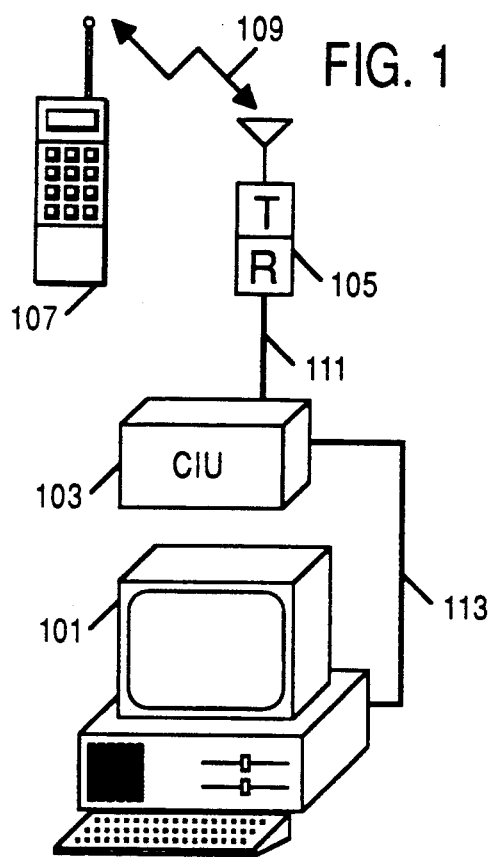
FIG. 1 is a block diagram of a communication system with key management in accordance with the invention.

When the system operator rekeys the communication units in the system, as shown in FIG. 1, the system operator sends a rekeying message over a typical communication channel 109, in this case an RF channel, using the KMC 101. The KMC 101 performs the necessary operations to assemble and encrypt the proper information and transfers this information as a rekeying message across a communication channel 113, in this case a phone line, at speeds up to 9600 baud to the CIU 103. A conventional data modem may be used to transfer data from the KMC 101 to the CIU 103 across the communication channel 113. The CIU 103 transforms the data from the KMC 101 to a 1200 baud MSK (Minimum-Shift Keying) signal suitable for transmission across a communication channel 111 to a base station 105, such as an MSF5000 transparent base station available from Motorola, Inc., which transmits the data over the communication channel 109 to the communication units 107 in the system. For larger systems with multiple base stations and CIUs, a distribution panel can be added between the KMC 101 and multiple CIUs 103 in multiplex fashion, as is known in the art. Although 9600 baud and 1200 baud are used in the preferred embodiment, other successful data rates exist.

Because it is difficult, if not impossible, to have access to all of the secure communication units to be rekeyed at the same time, the preferred embodiment incorporates the method of Key Indexing, as described in U.S. patent application Ser. No. 07/583,268, filed on Sep. 17, 1990 on behalf of Michael W. Bright et al., with the same assignee as the present invention, titled "Key Management in Encryption Systems." Key Indexing partitions a plurality of encryption keys into usable subgroups in order to maintain continuous secure communication throughout rekey periods. A rekey period is the time span required to rekey an entire system.

In order to reach communication units that are out of the RF range of the system at the time a rekeying message is sent, the system operator can transmit keys from the KMC to a KVL, via a modem and conventional telephone lines, as described in U.S. patent application Ser. No. 07/589,138, filed on Sep. 27, 1990 on behalf of Kurt W. Steinbrenner et al., with the same assignee as the present invention, titled "Key Management System.", now U.S. Pat. No. 5,093,860.

Figure 2:
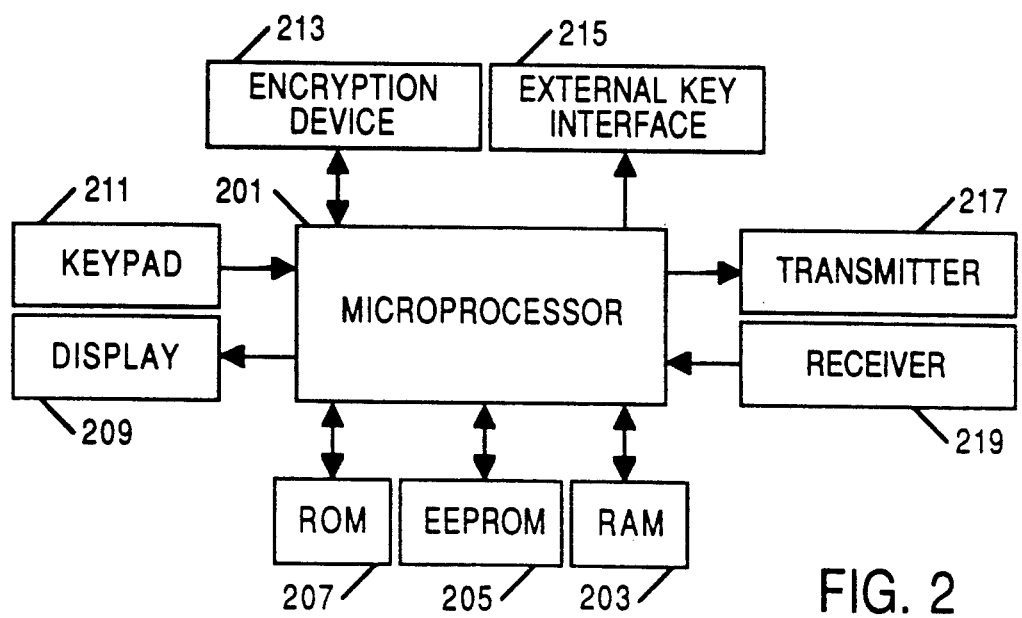
FIG. 2 is a block diagram of a communication unit in accordance with the invention.

FIG. 2 is a block diagram of a communication unit. The communication unit performs encryption management functions in a microprocessor 201, such as an MC68HC11 microprocessor, available from Motorola, Inc. The microprocessor 201 uses ROM 207 to store program information, such as the instructions to perform the steps in a flowchart, EEPROM 205 to store customer options, and RAM 203 to store keys and key information, such as key ID (identification) or key tags to indicate the use for the key. The microprocessor 201 is instructed at times to indicate various messages to the operator on the communication unit's display 209. A keypad 211 is available for operator entry of instructions, such as key selection or index selection. The display 209 and keypad 211 are not part of the CIU. An encryption device 213 encrypts and decrypts data as required by the microprocessor 201. An external key interface 215 provides a mechanism for keys and key information to be directly downloaded from a KVL into a communication unit 107 such as a mobile, portable, or CIU. The external key interface 215 in the KVL receives keys and key information from the KMC 101 and downloads the keys and key information to the other communication units 107. A transmitter 217 and receiver 219 modulate and demodulate data, respectively, for the communication unit for the unit's respective channel, as is known in the art.

The KMC performs rekeying functions individually, when a particular unit is rekeyed on a one-on-one basis, as determined by the KMC operator, as determined by the unit operator who is aware of the end of a rekey period and sends a rekey request to the KMC, or when a negative acknowledgment (NACK) is received from an individual unit as a result of a group rekey. Individual rekeying is described in the text for FIG. 3, FIG. 4, and FIG. 5. Rekey requests are described in the text for FIG. 7. Rekeying is also performed on a group basis, when a plurality of units are rekeyed with the same keys at substantially the same time due to group affiliation. Group rekeying is described in the text for FIG. 6. Formation of the fields in the messages required for individual rekeying, group rekeying, and rekey requests is described in the text for FIG. 8 through FIG. 15, inclusive.

Figure 3:
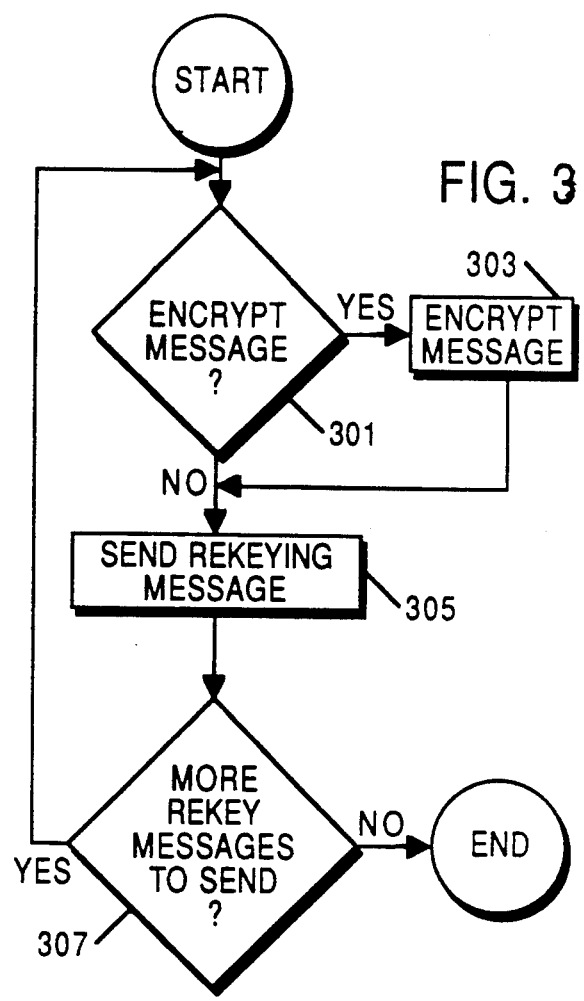
FIG. 3 is a flowchart showing individual rekeying with no acknowledgment in accordance with the invention.

FIG. 3 is a flowchart showing individual rekeying executed by the KMC with no acknowledgment. If at step 301, the system is configured to encrypt the rekeying message, the forming of which is described in the text for FIG. 8, the message is encrypted at step 303. The KMC sends the rekeying message (either encrypted or unencrypted) at step 305. If at step 307 more rekey messages are to be sent by the KMC, the process continues with step 301, and if no further messages are to be sent, the process ends.

Figure 4:
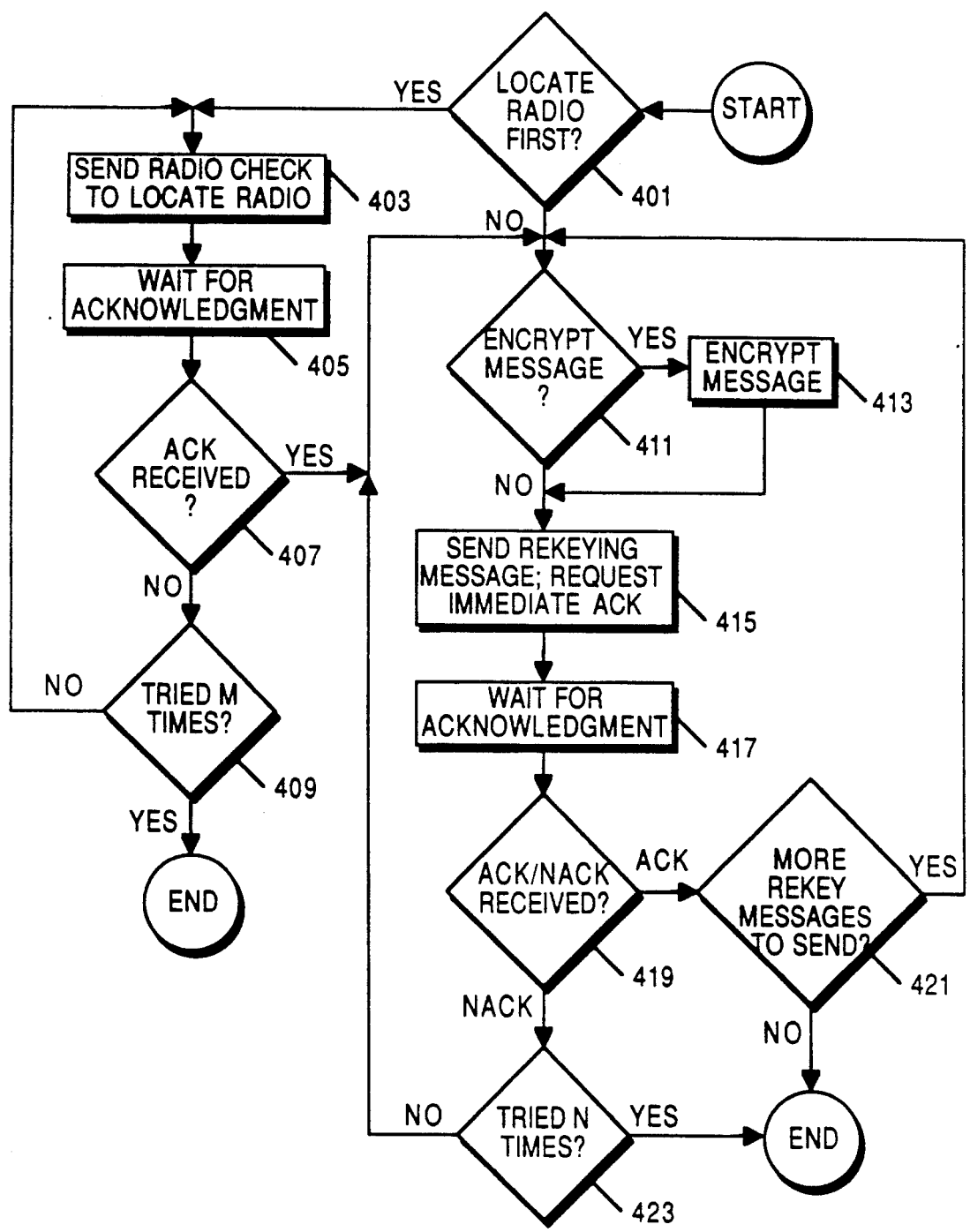
FIG. 4 is a flowchart showing individual rekeying with immediate acknowledgment in accordance with the invention.

FIG. 4 is a flowchart showing individual rekeying executed by the KMC with immediate acknowledgment (ACK for short) by the individual unit. If at step 401, the system is configured to locate the individual communication unit, the KMC sends a radio check sequence, as described in the text for FIG. 15W, to locate the radio at step 403. At step 405, the KMC waits a fixed time period, as determined for the particular system, for a location acknowledgment, as described in the text for FIG. 15W, from the communication unit. If at step 407, the location ACK is received, the process continues with step 411. If at step 407 a location ACK was not received, the process continues with step 409. If at step 409, the KMC has not received a location ACK in less than M attempts, where M is a number specifically set for the system, the process continues with step 403. If at step 409, the KMC has not received a location ACK in M attempts, the process ends. The use of the radio check block and subsequent location ACK keeps the KMC informed as to whether the radio is powered-up and within RF range of the KMC. If at step 411, the system is configured to encrypt the rekeying message, the forming of which is described in the text for FIG. 8, the message is encrypted at step 413. The KMC sends the rekeying message (either encrypted or unencrypted) with a request for immediate acknowledgment at step 415. At step 417, the KMC waits a fixed time period, as determined for the particular system, for an acknowledgment from the communication unit. See FIG. 9A for more information on acknowledgments. The KMC then checks for reception of an ACK or NACK at step 419. If an ACK was received, the process continues with step 421. If a NACK was received on less than N attempts at step 423, where N is a number specifically set for the system, the process continues with step 411, and if N attempts provides only NACKs, the process ends. If at step 421 more rekey messages are to be sent by the KMC, the process continues with step 411, and if no messages are to be sent, the process ends.

Figure 5:
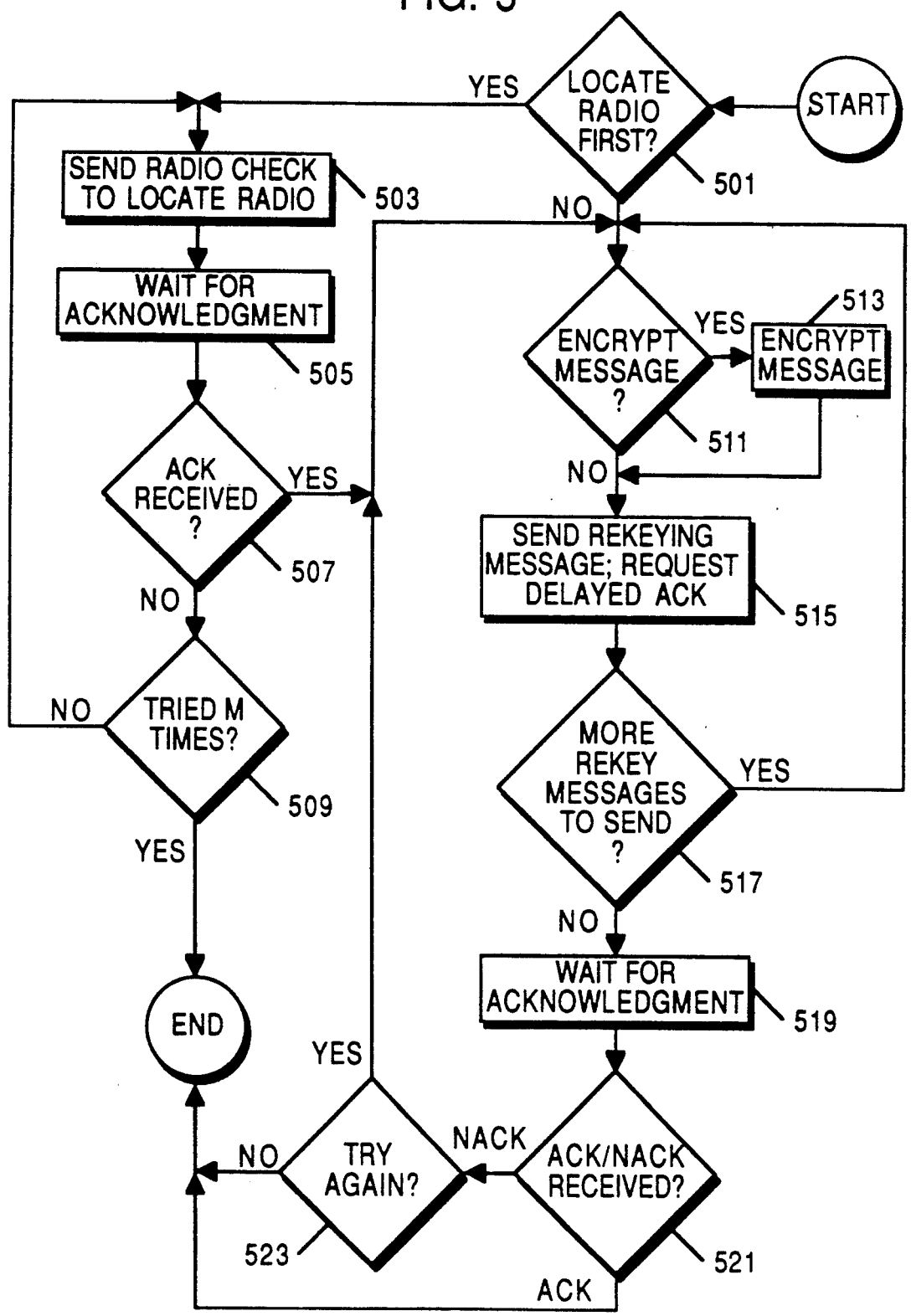
FIG. 5 is a flowchart showing individual rekeying with delayed acknowledgment in accordance with the invention.

FIG. 5 is a flowchart showing individual rekeying executed by the KMC with delayed acknowledgment by the communication unit. This type of individual rekeying is useful for surveillance or military type operation when it is inconvenient or damaging for a unit to transmit a message thus giving away its location. The system operator may also use this process to zeroize keys (make each binary bit of a key the value "0" which prevents encryption and decryption) in a stolen radio or disable the unit with an encrypted command that renders the unit useless to the thief. If at step 501, the system is configured to locate the individual communication unit, the KMC sends a radio check sequence, as described in the text for FIG. 15W, to locate the radio at step 503. At step 505, the KMC waits a fixed time period, as determined for the particular system, for a location acknowledgment, as described in the text for FIG. 15W, from the communication unit. If at step 507, a location acknowledgment is received, the process continues with step 511. If at step 507 a location ACK was not received, the process continues with step 509. If at step 509, the KMC has not received a location ACK in less than M attempts, where M is a number specifically set for the system, the process continues with step 503. If at step 509, the KMC has not received a location ACK in M attempts, the process ends. If at step 511, the system is configured to encrypt the rekeying message, the forming of which is described in the text for FIG. 8, the message is encrypted at step 513. The KMC sends the rekeying message (either encrypted or unencrypted) with a request for delayed acknowledgment at step 515. If at step 517 more rekey messages are to be sent by the KMC, the process continues with step 511, and if no further messages are to be sent, the KMC waits a fixed time period, as determined for the particular system, for an acknowledgment from the communication unit at step 519. See FIG. 9A for more information on acknowledgments. The KMC then checks for reception of an ACK or NACK at step 521. If an ACK was received, the process ends. If a NACK was received, and the KMC is configured at step 523 to try again, the process continues with step 511, otherwise the process ends.

Figure 6:
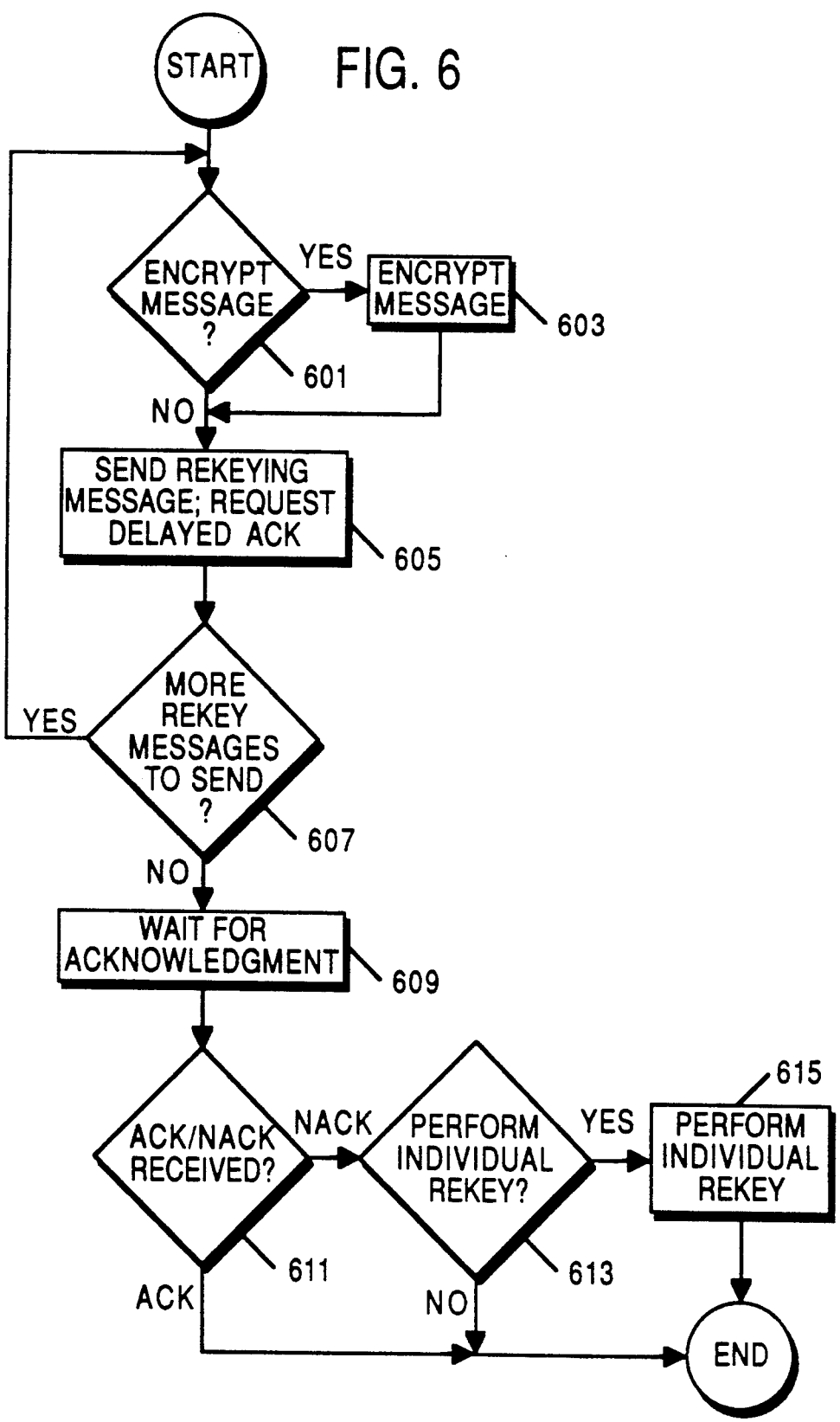
FIG. 6 is a flowchart showing group rekeying with delayed acknowledgment in accordance with the invention.

FIG. 6 is a flowchart showing group rekeying with delayed acknowledgment. If at step 601, the KMC is configured to encrypt to rekeying message, the forming of which is described in the text for FIG. 8, the message is encrypted at step 603. The KMC sends the encrypted or unencrypted rekeying message with a request for delayed acknowledgment to all group members simultaneously at step 605. If at step 607 more rekey messages are to be sent by the KMC, the process continues with step 601, and if no further messages are to be sent, the process continues with step 609. The KMC waits a fixed time period, as determined for the particular system, for an ACK from the communication unit at step 609. See FIG. 9A for more information on acknowledgments. The KMC then checks for reception of an ACK or NACK for each member of the group at step 611. If an ACK was received for each member of the group, the process ends. If a NACK was received for any member of the group, and the KMC is configured at step 613 to perfom an individual rekey for such a member, the KMC performs the individual rekey at step 615 (as described in the text for FIG. 3, FIG. 4, and FIG. 5), otherwise the process ends.

Figure 7:
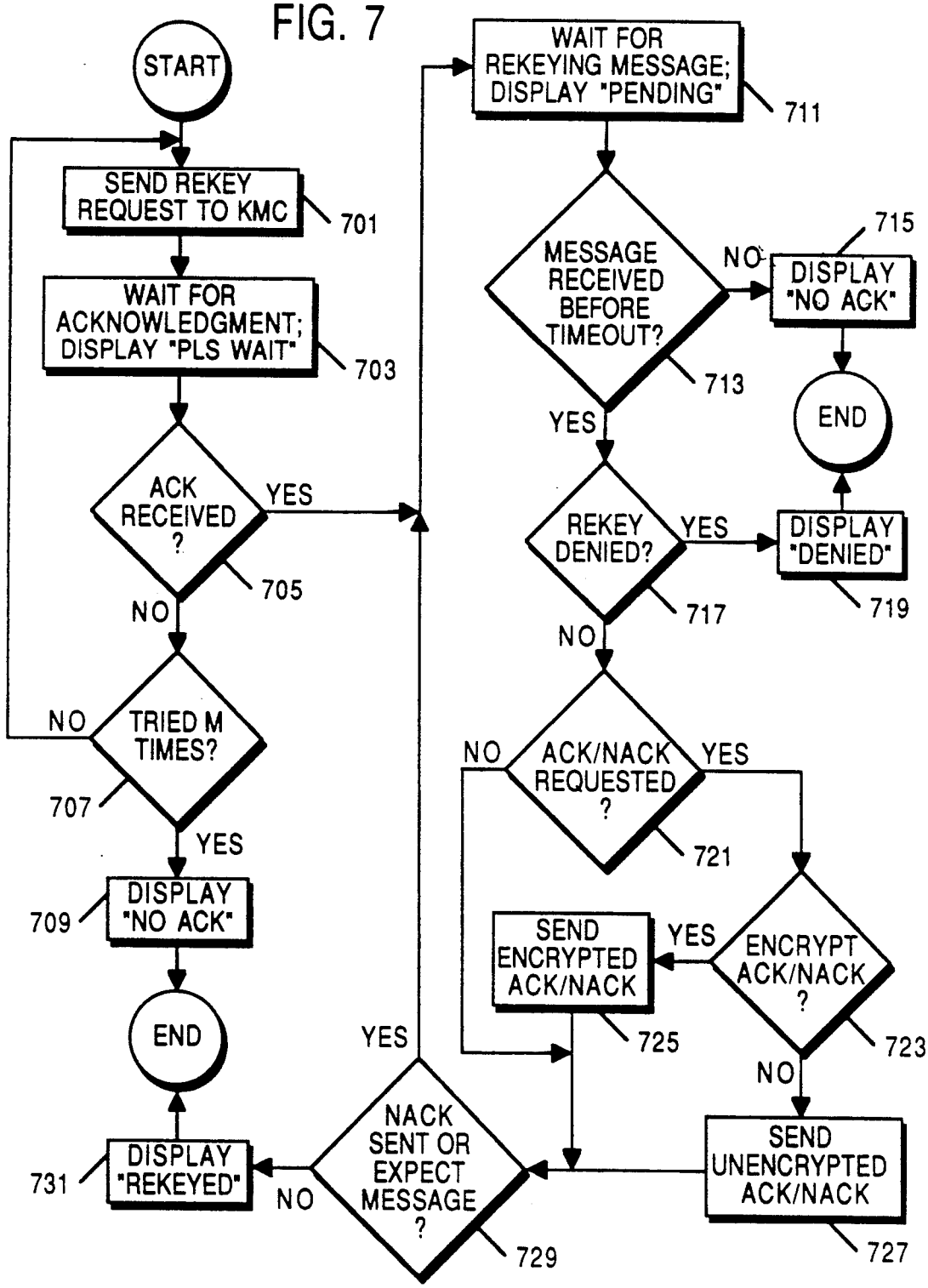
FIG. 7 is a flowchart showing a rekey request in accordance with the invention.

A rekey request is sent when a unit's operator is aware of the need to rekey and rekeying has not taken place, for example because the unit was not powered-up during rekeying or was out of RF range of the system. FIG. 7 is a flowchart showing a rekey request as executed by a communication unit. The (communication) unit sends a rekey request to the KMC, as described in the text for FIG. 10A, at step 701. The unit displays a "please wait" message as "PLS WAIT" while waiting for an acknowledgment, as shown in FIG. 15B, from the KMC at step 703. The KMC forms the acknowledgment of the rekey request in the same way a location acknowledgment is formed, as described in the text for FIG. 15W. The unit waits a fixed time period, as determined for the particular system, for the acknowledgment. If at step 705, an acknowledgment is received, the process continues with step 711. If at step 705 and ACK was not received, the process continues with step 707. If at step 707, the unit has not received an ACK in less than M attempts, where M is a number specifically set for the system, the process continues with step 701. If at step 707, the KMC has not received a location ACK in M attempts, the unit displays "NO ACK" at step 709 and the process ends. The unit waits a fixed time-out period, as determined for the particular system, for a rekeying message at step 711. If at step 713, a rekeying message was received before the time-out, the process continues with step 717. If at step 713 as rekeying message was not received before the time-out, the unit displays "NO ACK " at step 715 and the process ends. If the rekey request was denied at step 717, the unit displays "DENIED" and the process ends. If the rekey was not denied at step 717, the process continues with step 721. If neither an ACK nor a NACK were requested by the KMC at step 721, the process continues with step 729. If either an ACK or a NACK are requested by the KMC at step 721, the process continues with step 723. If the unit is configured to encrypt the ACK/NACK at step 723, the unit encrypts the ACK-/NACK and sends the encrypted version to the KMC at step 725. If the unit is not configured to encrypt the ACK/NACK at step 723, the unit sends the unencrypted ACK/NACK to the KMC at step 727. If a NACK was sent or another message is expected at step 729, the process continues with step 711, otherwise the unit displays "REKEYED" at step 731 and the process ends.

Figure 8:
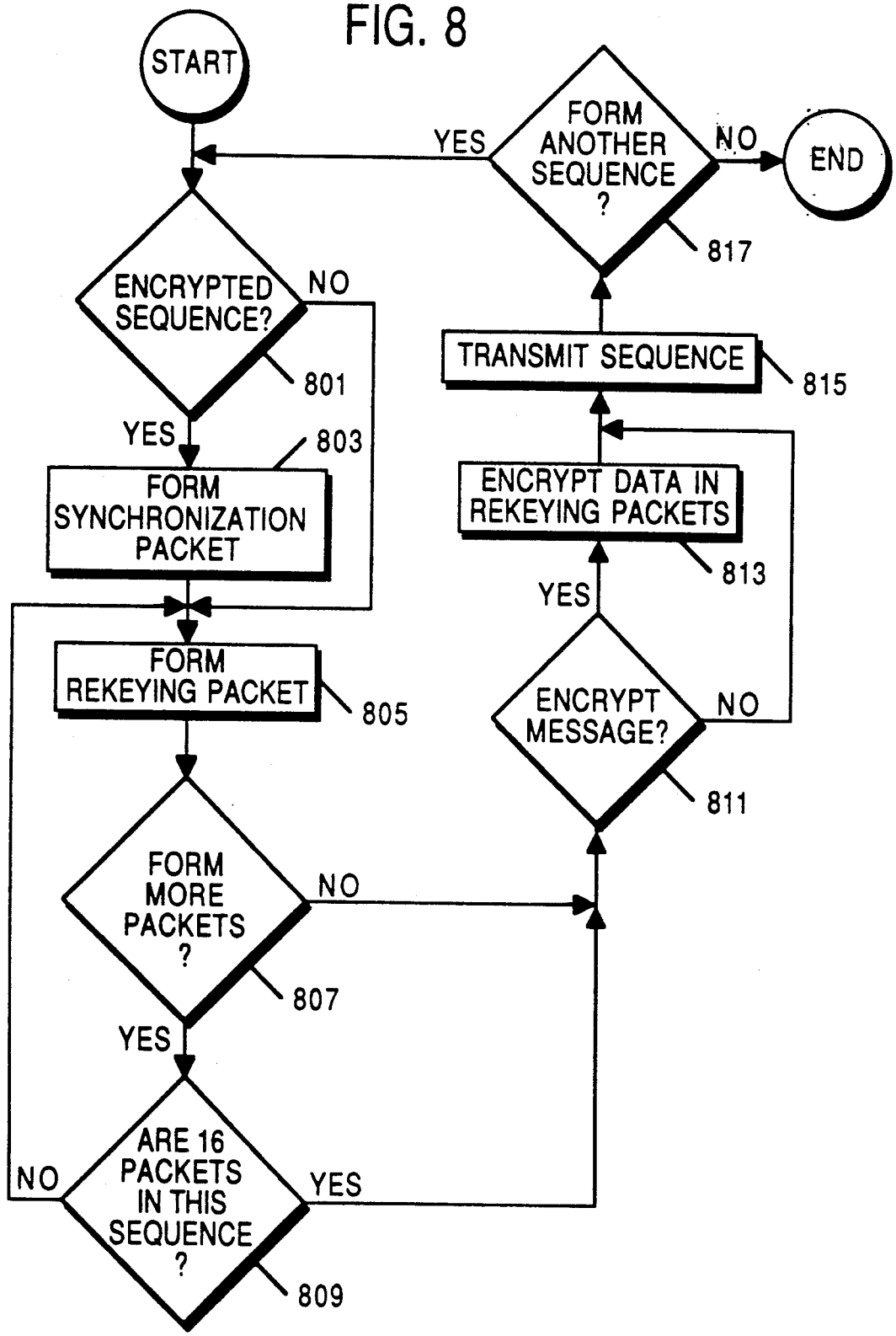
FIG. 8 is a flowchart showing formation of a rekeying message in accordance with the invention.

FIG.8 is a flowchart showing formation of a rekeying message, as executed by the KMC. In the preferred embodiment, a rekeying message consists of up to four sequences, and each sequence contains up to 16 packets. If at step 801 the sequence is to be encrypted, a synchronization packet is formed at step 803, as described in text for FIG. 11. A rekeying packet is formed at step 805, as described in the text for FIG. 12. If more packets are necessary to form the message at step 807, and if 16 packets are not yet in this sequence at step 809, the process continues with step 805. If this sequence contains 16 packets at step 809, the process continues with step 811. If the KMC is configured to encrypt the rekeying message at step 811, the data in the rekeying packets is encrypted at step 813. The KMC transmits the sequence to the CIU at step 815. If more sequences are to be formed at step 817, the process continues with step 801, otherwise the process ends. A bit field representation of a rekeying message with an encrypted rekeying packet is shown in FIG. 15A. The sync packet 1501 appears in the first field, and the encrypted rekeying packet 1503 appears in the second field. If the rekeying packet 1503 is not encrypted, the sync packet 1501 is not sent. In the preferred embodiment, a single rekeying message may contain one sync packet and up to 15 rekeying packets or 16 rekeying packets if unencrypted.

Formation of an acknowledgment message by a communication unit is shown in the flowchart in FIG. 9A. Use of acknowledgments as described here enables the KMC to track communication units and which keys have been properly received by the units. If at step 901, the acknowledgment is to be encrypted, a synchronization packet is formed at step 903. The formation is a synchronization packet is described in the text for FIG. 11. An acknowledgment packet is then formed at step 905. The formation of an acknowledgment packet is described in the text for FIG. 9B. If configured to encrypt the ACK message at step 907, the data in the acknowledgment packet is encrypted at step 909. At step 911, the communication unit transmits the message, and the process ends. FIG. 15B is a bit field representation of an acknowledgment message, where the acknowledgment packet is encrypted. The sync packet 1501 appears in the first field, and the encrypted ACK packet 1507 appears in the second field. If the ACK packet 1507 is not encrypted, the sync packet 1501 is not sent.

Figure 13:
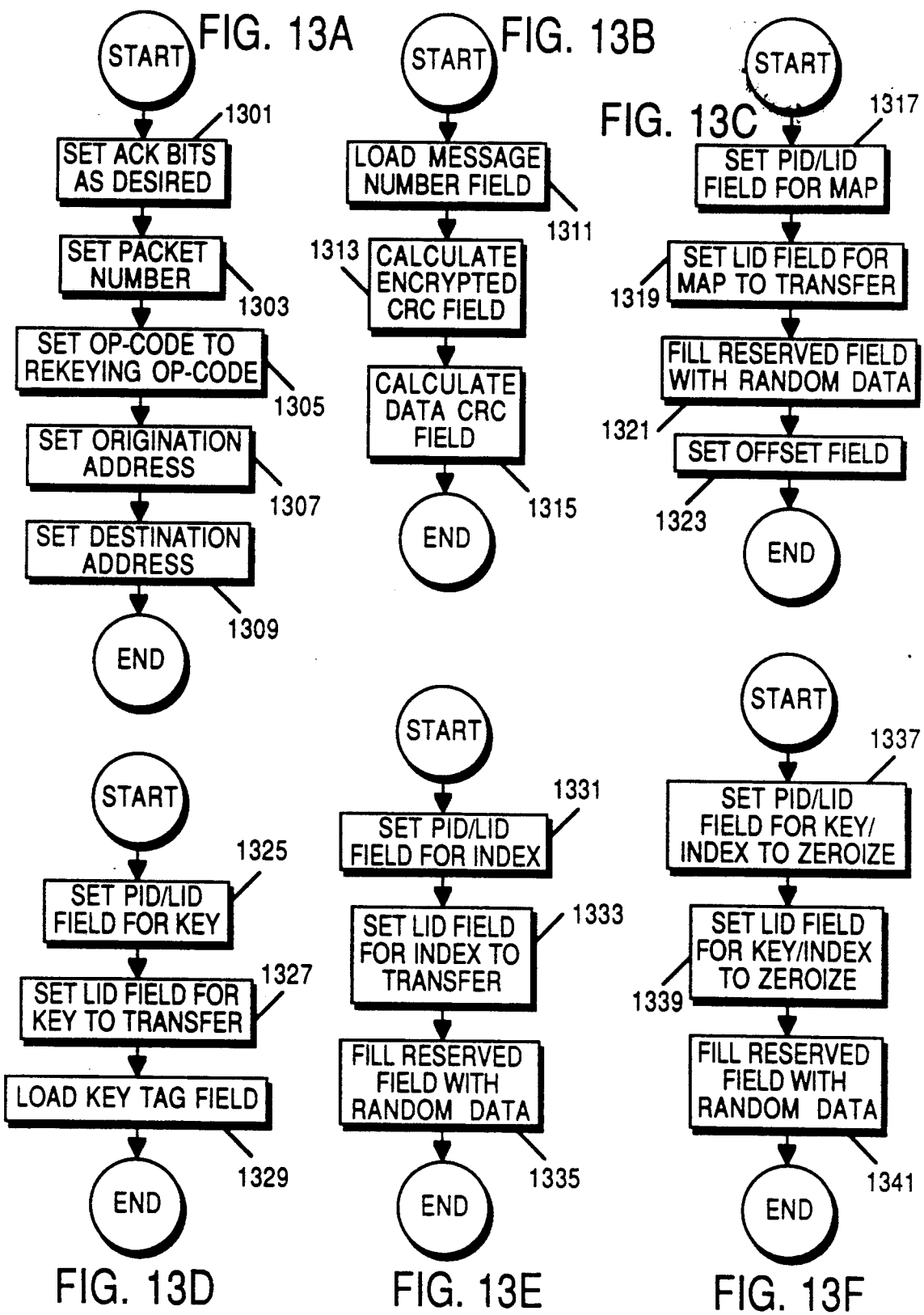
FIG. 13A is a flowchart showing formation of a keying control block in accordance with the invention.
FIG. 13B is a flowchart showing formation of an authentication control block in accordance with the invention.
FIG. 13C is a flowchart showing formation of a map ID block in accordance with the invention.
FIG. 13D is a flowchart showing formation of a key ID block in accordance with the invention.
FIG. 13E is a flowchart showing formation of an index ID block in accordance with the invention.
FIG. 13F is a flowchart showing formation of a zeroization ID block in accordance with the invention.

Formation of an acknowledgment packet is shown in the flowchart of FIG. 9B. A bit field representation of an acknowledgment packet is shown in FIG. 15C. The message header is formed at step 913. A message header is comprised of a general instruction block (GIB) 1509 and a general register block (GRB) 1511 and is formed as described in the text for FIG. 14. In the GIB 1509 for the ACK packet, the ACK and DST/SRC bits are set to 0. In the GRB 1511 for ACK packet, the block count is set to binary 0000011 and the (encrypt) mode bits are binary 00 if the ACK is not encrypted. A keying control block (KCB) 1513, as is described in the text for FIG. 13A, is formed at step 915. In the KCB 1513 for the ACK packet, the op-code, of the binary family 00001XXXX (e.g., 00001000,00001001, etc.), refers to one of 8 possible keys used to receive the previous/current message. An acknowledgment ID block (AIB) 1515, as is described in the text for FIG. 9C, if formed at step 917. An authentication control clock (ACB) 1517, as is described in the text for FIG. 13B, is then formed at step 919. The ACB 1517 is the last field in the ACK packet. All data in fields not detailed in this paragraph is formed according to the general definitions outlined for each field in FIG. 13, FIG. 14, and FIG. 15.

Formation of an acknowledgment ID block (AIB) is shown in the flowchart of FIG. 9C. A bit field representation of an AIB is shown in FIG. 15D. At step 921, the 16 packet ACK bits 1519 in the first bit field are set for the current sequence number (2 bits) and current message number (14 bits) for each packet received. At step 923, the 4 sequence ACK bits for the previous message and the 4 sequence ACK bits for the current message are place in the ACK/NACK sequence field 1521. At step 925, the type of error for the current sequence is indicated in the 8 bits of the error field 1523. The sequence ACK bits for the message are a logical AND of the packet ACK bits for each of the four sequences within a message. At step 927, the last field, the previous message number field 1525, is comprised of 16 bits that contain the number of the previous message received.

Figure 10A:
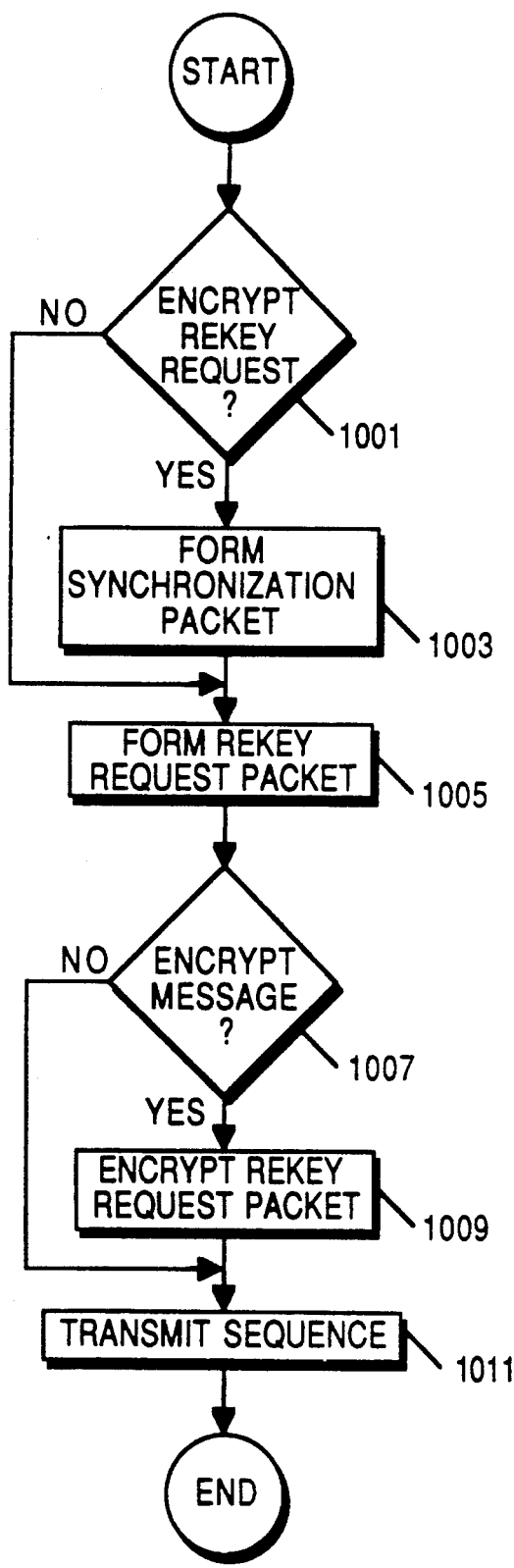
FIG. 10A is a flowchart showing formation of a rekey request message in accordance with the invention.

FIG. 10A is a flowchart showing formation of a rekey request message by a communication unit. If at step 1001, the rekey request is to be encrypted, a synchronization packet is formed at step 1003. The formation of a synchronization packet is described in the text for FIG. 11. An rekey request packet is then formed at step 1005. The formation of an rekey request packet is described in the text for FIG. 10B. If the communication unit is configured to encrypt the rekey request message at step 1007, the data in the rekey request packet is encrypted at step 1009. The communication unit transmits the message at step 1011, and the process ends. FIG. 15E is a bit field representation of a rekey request message, where the rekey request packet is encrypted. The sync packet 1501 appears in the first field, and the encrypted rekey request packet 1527 appears in the second field. If the rekey request packet 1507 is not encrypted, the sync packet 1501 is not sent.

Figure 10B:
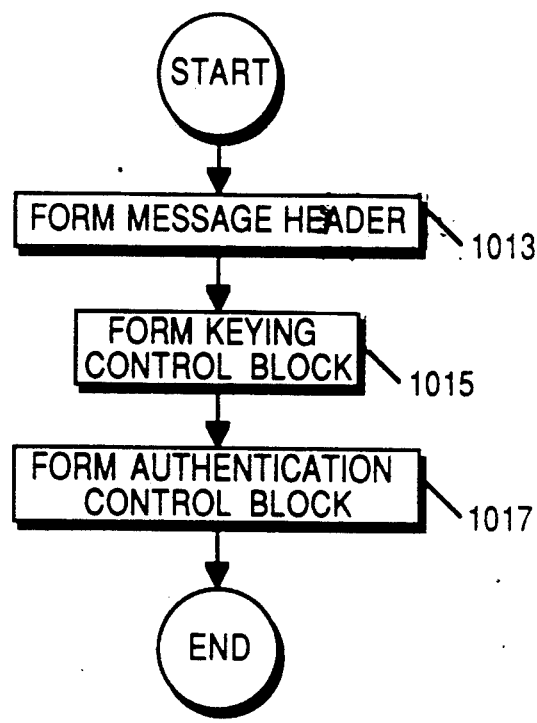
FIG. 10B is a flowchart showing formation of a rekey request packet in accordance with the invention.

FIG. 10B is a flowchart showing formation of a rekey request packet. A bit field representation of a rekey request packet is shown in FIG. 15F. The message header is formed at step 1013. A message header is comprised of a general instruction block (GIB) 1509 and a general register block (GRB) 1511 and is formed as described in the text for FIG. 14. In the GIB 1509 for the rekey request packet, the DST/SRC bit is set to 0 and the ACK bit is set to 1 requesting an ACK. In the GRB 1511 for the rekey request packet, the block count is set to binary 0000010 and the (encrypt) mode bits are binary 00 if the ACK is not encrypted. A keying control block (KCB) 1513, as is described in the text for FIG. 13A, is formed at step 1015. In the KCB 1513 for the rekey request packet, the op-code, either binary 01100000 or 0110001, refers to the key to be used to transmit new keys. An authentication control block (ACB) 1517, as is described in the text for FIG. 13B, is then formed at step 1017. The ACB 1517 is the last field in the ACK packet. All data in fields not detailed in this paragraph is formed according to the general definitions outlined for each field in FIG. 13, FIG. 14, and FIG. 15.

Figure 11:
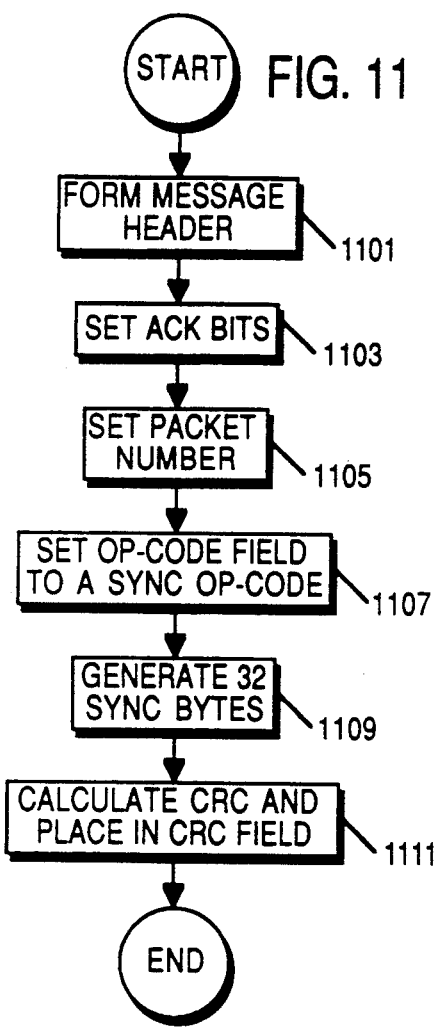
FIG. 11 is a flowchart showing formation of a synchronization packet in accordance with the invention.

FIG. 11 is a flowchart showing formation of a synchronization packet. A bit field representation of a synchronization packet is shown in FIG. 15G. The message header is formed at step 1101. A message header is comprised of a general instruction block (GIB) 1509 and a general register block (GRB) 1511 and is formed as described in the text for FIG. 14. In the GIB 1509 for the synchronization packet, the ACK bit is set to 0. In the GRB 1511 for the synchronization packet, the block count is set to binary 0000110 and the (encrypt) mode bits are binary 00. At step 1103, the 4 ACK bits 1529 are set, in order, 1) unused; 2) 0 for delayed ACK, 1 for immediate ACK; 3) 0 for unencrypted ACK, 1 for encrypted ACK; and 4) 0 for no ACK sent, 1 for ACK sent. At step 1105, the 4-bit packet number field 1531 is set to the number of packets within the sequence. At step 1107, the 8-bit op-code field is set to a sync op-code, one of the binary family 000000XX, which defines the type of synchronization provided. At step 1109, 32 bytes of synchronization are generated and placed in the sync field 1535. At step 1111, the CRC (cyclic redundancy check, as is known in the art) is calculated on all fields except for the message header 1509 and 1511, in the preferred embodiment, and placed in the 16-bit CRC field 1537.

Before transmitting a message to the CIU 103, the KMC 101 partitions each message (except for the message header 1509 and 1511) into 48-bit (6-byte) data blocks. The CIU 103 performs error correction for each 48-bit data block before it transmits the message to the base station 105. The communication unit partitions each rekey request or acknowledgment message (except for the message header 1509 and 1511) into 48-bit data blocks and performs error correction for each 48-bit data block before it transmits the message. When a message is encrypted in the preferred embodiment, all data is encrypted except for the sync packet 1501, message header 1509 and 1511, the last two bytes of the ACB 1517, and any error correction data.

Figure 12:
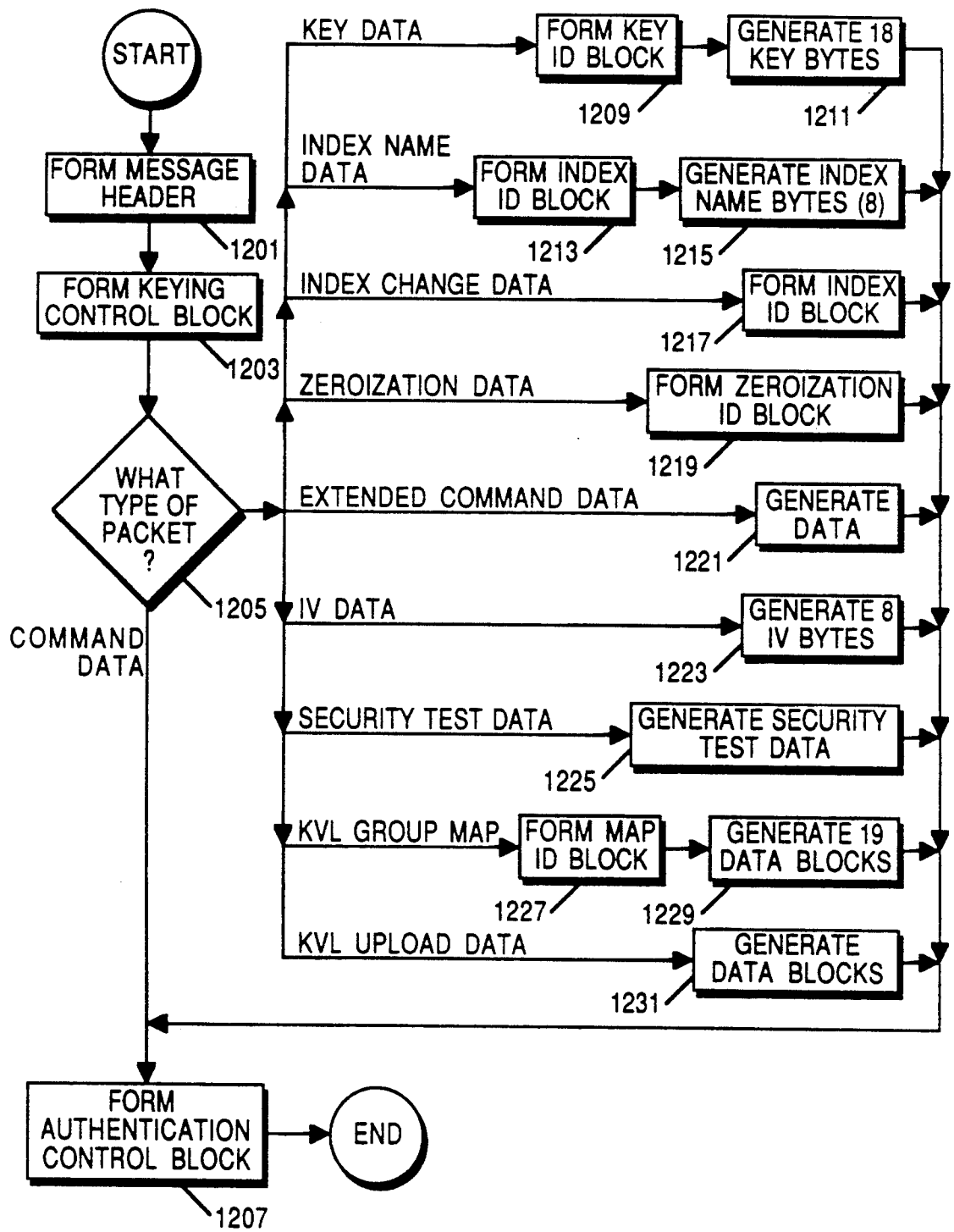
FIG. 12 is a flowchart showing formation of a rekeying packet in accordance with the invention.

FIG. 12 is a flowchart showing formation of a rekeying packet. Ten different types of information can be placed in a rekeying packet. For each of these 10 cases, a message header is formed at step 1201, a KCB is formed at step 1203, the determination of packet type is made at step 1205, and an ACB is formed at step 1207. The following ten paragraphs describe the formation of each of the ten different types of rekeying packets.

A bit field representation of a rekeying packet with command data is shown in FIG. 15F. The message header, formed at step 1201, is comprised of a general instruction block (GIB) 1509 and a general register block (GRB) 1511 and is formed as described in the text for FIG. 14. In the GIB 1509 for the rekeying packet with command data, the ACK bit is set to 0 and the DST/SRC bit is set to 1. In the GRB 1511 for the rekeying packet with command data, the block count is set to binary 0000010 and the (encrypt) mode bits are binary 01. A keying control block (KCB) 1513, as is described in the text for FIG. 13A, is formed at step 1203. In the KCB 1513 for the rekeying packet with command data, the op-code, of the binary family 01000XXX, refers to one of 8 commands the KMC can send to the communication unit, such as a security status check. An authentication control block (ACB) 1517, as described in the text for FIG. 13B, is then formed at step 1207. The ACB 1517 is the last field in the rekeying packet with command data. All data in fields not detailed in this paragraph is formed according to the general definitions outlined for each field in FIG. 13, FIG. 14, and FIG. 15.

FIG. 15H is a bit field representation of a rekeying packet with key data. The message header, formed at step 1201, is comprised of a general instruction block (GIB) 1509 and a general register block (GRB) 1511 and is formed as described in the text for FIG. 14. In the GIB 1509 for the rekeying packet with key data, the ACK bit is set to 0 and the DST/SRC bit is set to 1. In the GRB 1511 for the rekeying packet with key data, the block count is set to binary 0000110 and the (encrypt) mode bits are binary 01. A keying control block (KCB) 1513, as is described in the text for FIG. 13A, is formed at step 1203. In the KCB 1513 for the rekeying packet with key data, the 4 ACK bits are set, in order, 1) unused; 2) 0 for delayed ACK, 1 for immediate ACK; 3) 0 for unencrypted ACK, 1 for encrypted ACK; and 4) 0 for no ACK sent, 1 for ACK sent. In this KCB 1513, the op-code, of the binary family 0001X0XX, indicates which segment of the encryption key is included in this packet and whether the key address is specified as a logical or physical ID. A physical ID is the slot in memory where the key resides. A logical ID is a 16-bit number assigned to the key. At step 1209, a key ID block (KIB) 1539, as described in the text for FIG. 13D, is formed. The KMC then generates 18 key bytes 1541 at step 1211. An authentication control block (ACB) 1517, as is described in the text for FIG. 13B, is then formed at step 1207. The ACB 1517 is the last field in the rekeying packet with key data. All data in fields not detailed in this paragraph is formed according to the general definitions outlined for each field in FIG. 13, FIG. 14, and FIG. 15.

FIG. 15I is a bit field representation of a rekeying packet with index name data. The message header, formed at step 1201, is comprised of a general instruction block (GIB) 1509 and a general register block (GRB) 1511 and is formed as described in the text for FIG. 14. In the GIB 1509 for the rekeying packet with index name data, the ACK bit is set to 0 and the DST/SRC bit is set to 1. In the GRB 1511 for the rekeying packet with index name data, the block count is set to binary 0000101 and the (encrypt) mode bits are binary 01. A keying control block (KCB) 1513, as is described in the text for FIG. 13A, is formed at step 1203. In the KCB 1513 for the rekeying packet with index name data, the op-code is either binary 00100000 or 00101000, indicating whether the index destination location is specified as a logical or physical ID. At step 1213, an index ID block (IIB) 1543 is formed, as described in the text for FIG. 13E. The KMC then generates 8 index name bytes 1545 with 4 reserved bytes 1547 at step 1215. An authentication control block (ACB) 1517, as is described in the text for FIG. 13B, is then formed at step 1207. The ACB 1517 is the last field in the rekeying packet with index name data. All data in fields not detailed in this paragraph is formed according to the general definitions outlined for each field in FIG. 13, FIG. 14, and FIG. 15.

FIG. 15J is a bit field representation of a rekeying packet with index change data. The message header, formed at step 1201, is comprised of a general instruction block (GIB) 1509 and a general register block (GRB) 1511 and is formed as described in the text for FIG. 14. In the GIB 1509 for the rekeying packet with index change data, the ACK bit is set to 0 and the DST/SRC bit is set to 1. In the GRB 1511 for the rekeying packet with index change data, the block count is set to binary 0000011 and the (encrypt) mode bits are binary 01. A keying control block (KCB) 1513, as is described in the text for FIG. 13A, is formed at step 1203. In the KCB 1513 for the rekeying packet with index change data, the op-code is either binary 00100100 or 00101100 and indicates whether the index destination location is specified as a logical or physical ID. At step 1217, an index ID block (IIB) 1543 is formed, as described in the text for FIG. 13E. An authentication control block (ACB) 1517, as is described in the text for FIG. 13B, is then formed at step 1207. The ACB 1517 is the last field in the rekeying packet with index change data. All data in fields not detailed in this paragraph is formed according to the general definitions outlined for each field in FIG. 13, FIG. 14, and FIG. 15.

FIG. 15K is a bit field representation of a rekeying packet with zeroization data. The message header, formed at step 1201, is comprised of a general instruction block (GIB) 1509 and a general register block (GRB) 1511 and is formed as described in the text for FIG. 14. In the GIB 1509 for the rekeying packet with zeroization data, the ACK bit is set to 0 and the DST/SRC bit is set to 1. In the GRB 1511 for the rekeying packet with zeroization data, the block count is set to binary 0000011 and the (encrypt) mode bits are binary 01. A keying control block (KCB) 1513, as is described in the text for FIG. 13A, is formed at step 1203. In the KCB 1513 for the rekeying packet with zeroization data, the op-code, of the binary family 0011X0XX, indicates whether the key(s) to be zeroized is (are) specified as a logical or physical key or index ID. At step 1219, a zeroization ID block (ZIB) 1549 is formed, as described in the text for FIG. 13F. An authentication control block (ACB) 1517, as is described in the text for FIG. 13B, is then formed at step 1207. The ACB 1517 is the last field in the rekeying packet with zeroization data. All data in fields not detailed in this paragraph is formed according to the general definitions outlined for each field in FIG. 13, FIG. 14, and FIG. 15.

FIG. 15L is a bit field representation of a rekeying packet with extended command data. The message header, formed at step 1201, is comprised of a general instruction block (GIB) 1509 and a general register block (GRB) 1511 and is formed as described in the text for FIG. 14. In the GIB 1509 for the rekeying packet with extended command data, the ACK bit is set to 0 and the DST/SRC bit is set to 1. In the GRB 1511 for the rekeying packet with extended command data, the block count is set to binary 0000011 and the (encrypt) mode bits are binary 01. A keying control block (KCB) 1513, as is described in the text for FIG. 13A, is formed at step 1203. In the KCB 1513 for the rekeying packet with extended command data, the op-code, of the binary family 01001XXX, refers to one of 8 commands the KMC can send to the communication unit. Six bytes of data 1551 are generated at step 1221. An authentication control block (ACB) 1517, as described in the text for FIG. 13B, is then formed at step 1207. The ACB 1517 is the last field in the rekeying packet with extended command data. All data in fields not detailed in this paragraph is formed according to the general definitions outlined for each field in FIG. 13, FIG. 14, and FIG. 15.

Figure 14:
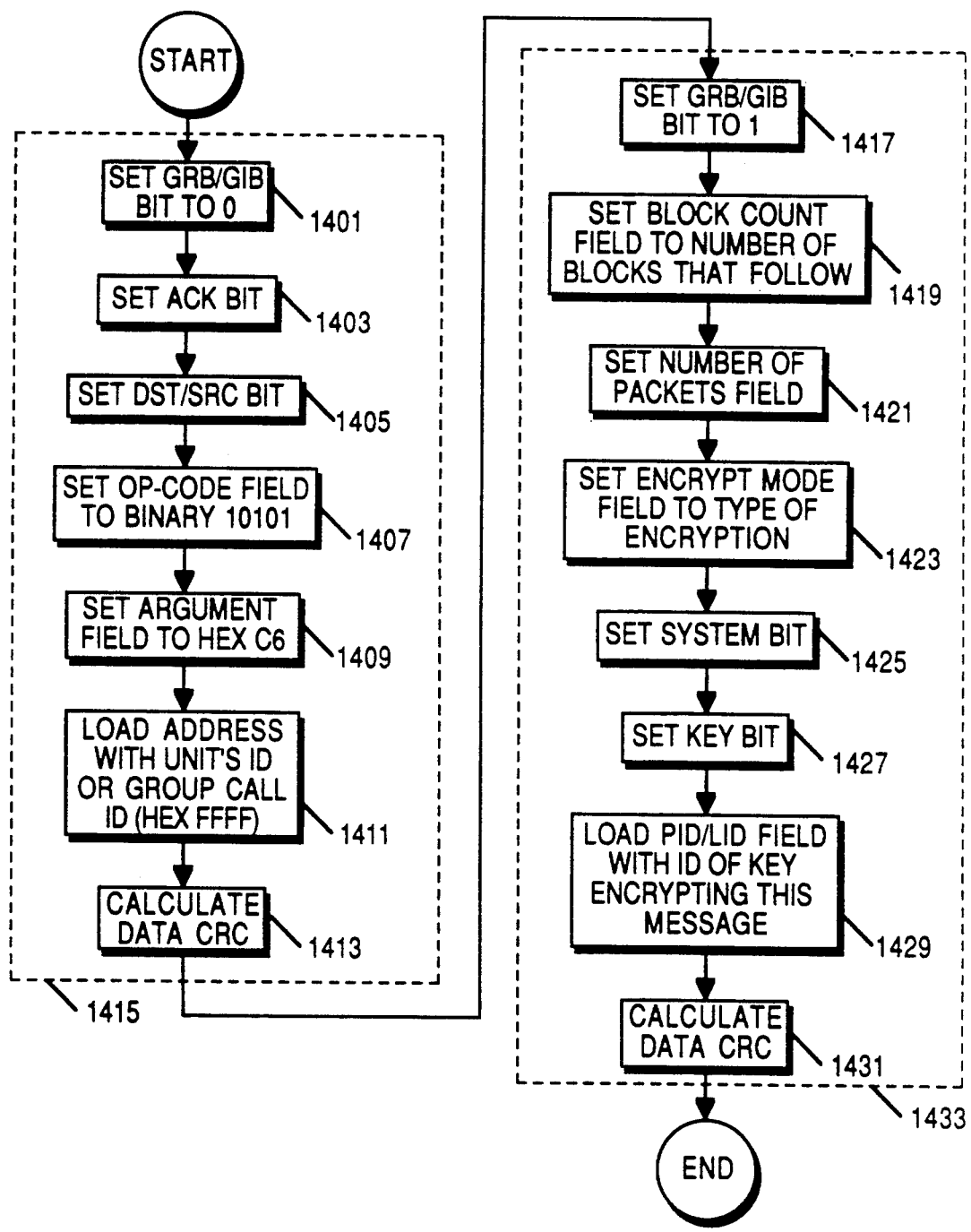
FIG. 14 is a flowchart showing formation of a general instruction block and a general register block in accordance with the invention.
Figure 15M:
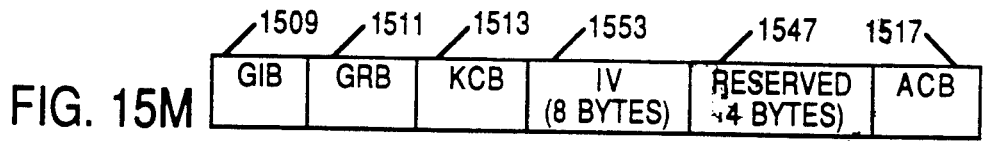
FIG. 15M is a bit field representation of a rekeying packet with initialization vector data in accordance with the invention.

FIG. 15M is a bit field representation of a rekeying packet with initialization vector (IV) data. The message header, formed at step 1201, is comprised of a general instruction block (GIB) 1509 and a general register block (GRB) 1511 and is formed as described in the text for FIG. 14. In the GIB 1509 for the rekeying packet with initialization vector data, the ACK bit is set to 0 and the DST/SRC bit is set to 1. In the GRB 1511 for the rekeying packet with initialization vector data, the block count is set to binary 0000100 and the (encrypt) mode bits are binary 01. A keying control block (KCB) 1513, as is described in the text for FIG. 13A, is formed at step 1203. In the KCB 1513 for the rekeying packet with initialization vector data, the op-code is binary 01010000, refers to an initialization vector that provides an initial starting point for the encryption algorithm. An 8-byte IV packet 1553 and 4-byte reserved field 1547 are generated at step 1223. An authentication control block (ACB) 1517, as described in the text for FIG. 13B, is then formed at step 1207. The ACB 1517 is the last field in the rekeying packet with initialization vector data. All data in fields not detailed in this paragraph is formed according to the general definitions outlined for each field in FIG. 13, FIG. 14, and FIG. 15.

Figure 15N:
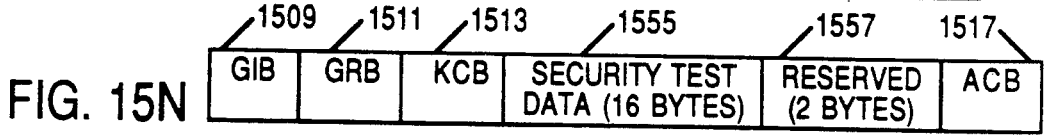
FIG. 15N is a bit field representation of a rekeying packet with security test data in accordance with the invention.

FIG. 15N is a bit field representation of a rekeying packet with security test data. The message header, formed at step 1201, is comprised of a general instruction block (GIB) 1509 and a general register block (GRB) 1511 and is formed as described in the text for FIG. 14. In the GIB 1509 for the rekeying packet with security test data, the ACK bit is set to 0 and the DST/SRC bit is set to 1. In the GRB 1511 for the rekeying packet with security test data, the block count is set to binary 0000101 and the (encrypt) mode bits are binary 01. A keying control block (KCB) 1513, as is described in the text for FIG. 13A, is formed at step 1203. In the KCB 1513 for the rekeying packet with security test data, the op-code is binary 01010001, refers to security test data which is used to insure the integrity of the encryption device. A 16-byte packet of security test data 1555 and 2-byte reserved field 1557 are generated at step 1225. An authentication control block (ACB) 1517, as described in the text for FIG. 13B, is then formed at step 1207. The ACB 1517 is the last field in the rekeying packet with security test data. All data in fields not detailed in this paragraph is formed according to the general definitions outlined for each field in FIG. 13, FIG. 14, and FIG. 15.

Figure 15P:
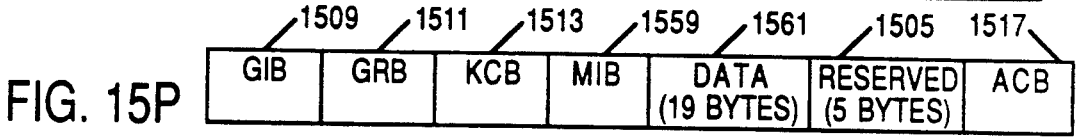
FIG. 15P is a bit field representation of a rekeying packet with a KVL group map in accordance with the invention.

FIG. 15P is a bit field representation of a rekeying packet with a KVL group map. The message header, formed at step 1201, is comprised of a general instruction block (GIB) 1509 and a general register block (GRB) 1511 and is formed as described in the text for FIG. 14. In the GIB 1509 for the rekeying packet with a KVL group map, the ACK bit is set to 0 and the DST/SRC bit is set to 1. In the GRB 1511 for the rekeying packet with a KVL group map, the block count is set to binary 0000111 and the (encrypt) mode bits are binary 01. A keying control block (KCB) 1513, as is described in the text for FIG. 13A, is formed at step 1203. In the KCB 1513 for the rekeying packet with a KVL group map, the op-code is binary 01010010, refers to a KVL group map which maps keys stored in the KVL to a key assignment group that is defined for one or more communication units. At step 1227, a map ID block (MIB) 1559 is formed, as described in the text for FIG. 13C. 19 bytes of KVL group map data 1561 and a 5-byte reserved field 1505 are generated at step 1229. An authentication control block (ACB) 1517, as described in the text for FIG. 13B, is then formed at step 1207. The ACB 1517 is the last field in the rekeying packet with a KVL group map. All data in fields not detailed in this paragraph is formed according to the general definitions outlined for each field in FIG. 13, FIG. 14, and FIG. 15.

Figure 15Q:
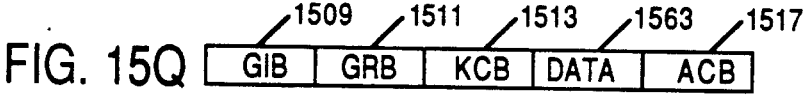
FIG. 15Q is a bit field representation of a rekeying packet with KVL upload information in accordance with the invention.

FIG. 15Q is a bit field representation of a rekeying packet with KVL upload data. The message header, formed at step 1201, is comprised of a general instruction block (GIB) 1509 and a general register block (GRB) 1511 and is formed as described in the text for FIG. 14. In the GIB 1509 for the rekeying packet with KVL upload data, the ACK and DST/SRC bits are set to 0. In the GRB 1511 for the rekeying packet with KVL upload data, the block count is set to the number of blocks (a block is comprised of 6 bytes) in the message following the GRB 1511 and the (encrypt) mode bits are binary 00. A keying control block (KCB) 1513, as is described in the text for FIG. 13A, is formed at step 1203. In the KCB 1513 for the rekeying packet with KVL upload data, the op-code is binary 01010011, refers to KVL upload data sent in this message. One or more blocks of KVL upload data 1563 is generated at step 1231, as needed by the KMC. An authentication control block (ACB) 1517, as described in the text for FIG. 13B, is then formed at step 1207. The ACB 1517 is the last field in the rekeying packet with KVL upload data. All data in fields not detailed in this paragraph is formed according to the general definitions outlined for each field in FIG. 13, FIG. 14, and FIG. 15.

Figure 15R:
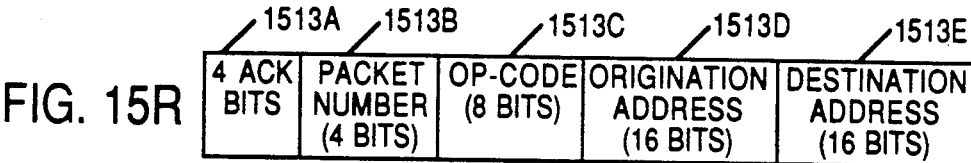
FIG. 15R is a bit field representation of a keying control block in accordance with the invention.

FIG. 13A is a flowchart showing formation of a keying control block (KCB). FIG. 15R is a bit field representation of a keying control block. In step 1301, the four ACK bits 1513A are set as desired. These four bits are, in order, 1) unused; 2) IMM/DLY bit: 0 for delayed ACK, 1 for immediate ACK; 3) COD/CLR bit: 0 for unencrypted ACK, 1 for encrypted ACK; and 4) ACK-/NO bit: 0 for no ACK sent, 1 for ACK as specified by IMM/DLY and COD/CLR bits. The packet number field 1513B is set at step 1303 to the current 4-bit packet number in the rekeying message. The op-code field 1513C is set in step 1305 to the appropriate 8-bit rekeying op-code. At step 1307, the origination address 1513D is set to the 16-bit address of the unit initiating the message. At step 1309, the destination address 1513E is set to the 16-bit address of the unit receiving the message.

Figure 17:
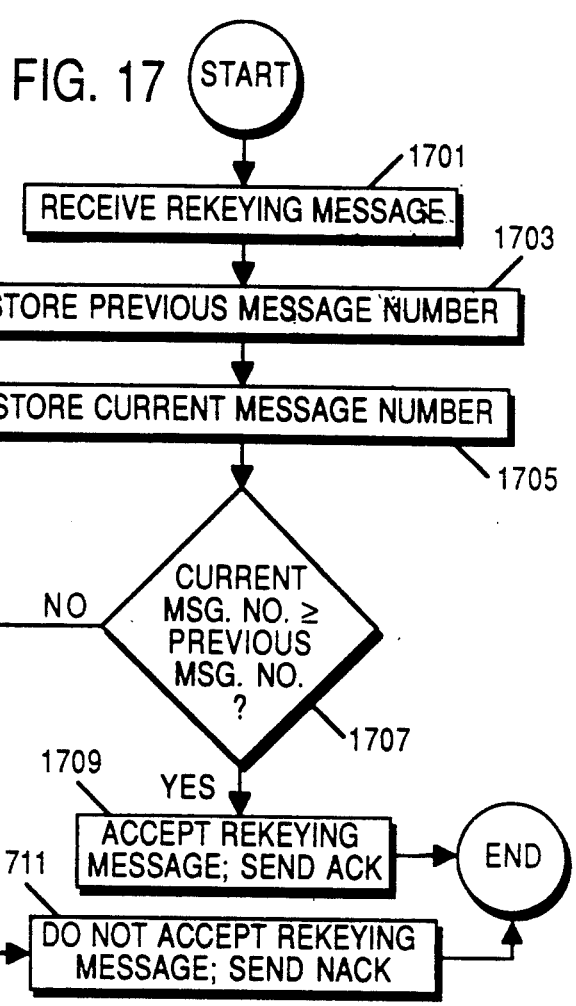
FIG. 17 is a flowchart showing rekeying message authentication in accordance with the invention.
Figure 15S:
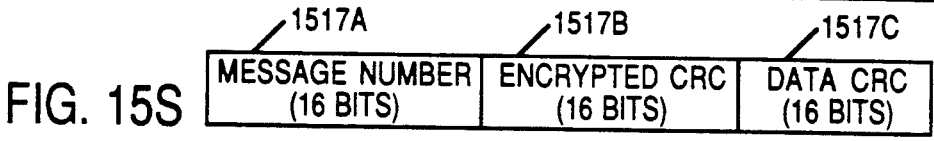
FIG. 15S is a bit field representation of an authentication control block in accordance with the invention.

FIG. 13B is a flowchart showing formation of authentication control block (ACB). FIG. 15S is a bit field representation of an authentication control block. At step 1311, the message number field 1517A is loaded with the current 16-bit message number (2-bit sequence number and 14-bit message number). At step 1313, the encrypted CRC field 1517B, 16 bits in length, is filled by calculating the CRC on all blocks except for the GIB 1509 and GRB 1511 and the first two bytes of the current block. At step 1315, the data CRC field 1517C, 16 bits in length, is filled by calculating the CRC on all blocks except for the GIB 1509 and GRB 1511 and the first four bytes of the current block. FIG. 17 has rekeying message authentication information.

Figure 15T:
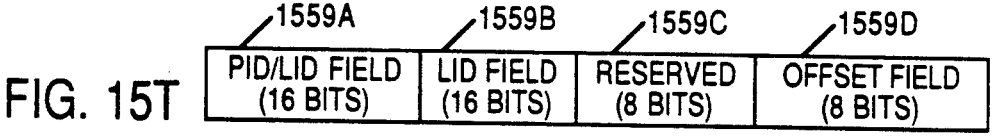
FIG. 15T is a bit field representation of a map ID block in accordance with the invention.

FIG. 13C is a flowchart showing formation of a map ID block (MIB). FIG. 15T is a bit field representation of a map ID block. At step 1317, the PID/LID (physical ID/logical ID) field 1559A is set to indicate the 16-bit destination of the map in the KVL to be replaced. At step 1319, the LID (logical ID) field 1559B is set to the 16-bit logical ID of the map to be transferred. At step 1321, the 8-bit reserved field 1559C is filled with random data. At step 1323, the 8-bit offset field 1559D is set with the offset number for data storage within the KVL.

Figure 15U:
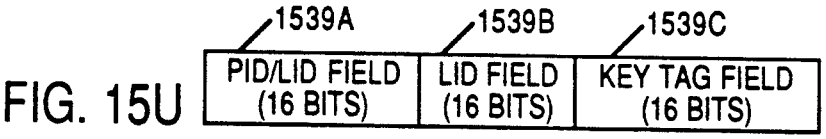
FIG. 15U is a bit field representation of a key ID block in accordance with the invention.

FIG. 13D is a flowchart showing formation of a key ID block (KIB). FIG. 15U is a bit field representation of a key ID block. At step 1325, the PID/LID field 1539A is set to indicate the 16-bit destination of the key to be replaced. At step 1327, the LID field 1539B is set with the 16-bit logical ID of the key to be transferred. At step 1329, the 16-bit key tag field 1539C is loaded with data on use and operation of the key to be transferred.

Figure 15V:
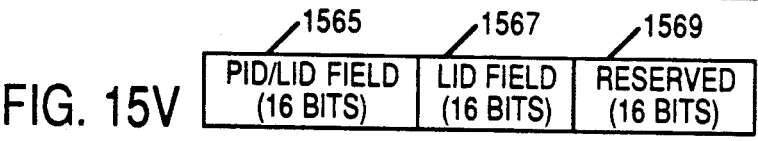
FIG. 15V is a bit field representation of an index ID block and a zeroization ID block in accordance with the invention.

FIG. 13E is a flowchart showing formation of an index ID block (IIB). A bit field representation of an index ID block is shown in FIG. 15V. At step 1331, the PID/LID field 1565 is set to indicate the 16-bit destination address of the index to be replaced. At step 1333, the LID field 1567 is set with the 16-bit logical ID of the index to be transferred. At step 1335, the 16-bit reserved field 1569 is filled with random data.

FIG. 13F is a flowchart showing formation of a zeroization ID block (ZIB). A bit field representation of a zeroization ID block is shown in FIG. 15V. At step 1337, the PID/LID field 1565 is set to indicate the 16-bit destination address of the key or index to be zeroized. At step 1339, the LID field 1567 is set with the 16-bit logical ID for the key or index to be zeroized. At step 1341, the 16-bit reserved field 1569 is filled with random data.

Figure 15W:
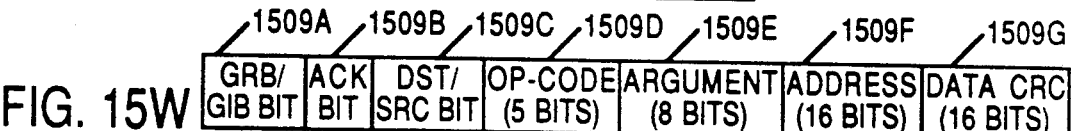
FIG. 15W is a bit field representation of a general instruction block, a radio check block, and a location acknowledgment in accordance with the invention.

FIG. 14 is a flowchart showing formation of a message header, which is comprised of a general instruction block (GIB) 1509 and a general register block (GRB) 1511. A (binary) bit field representation of a general instruction block 1509 is shown in FIG. 15W. Formation of a GIB 1509 includes those steps within a first dashed block 1415. At step 1401, the GRB/GIB bit 1509A is always set to 0. At step 1403, the ACK bit 1509B is set to 1 if an ACK is required or 0 if an ACK is not required. At step 1405, the DST/SRC bit (Destination/Source bit) 1509C is set to 1 if the address field contains the destination address or a 0 if the address field contains the source address. At step 1407, the 5-bit op-code 1509D is set to binary 10101, designating a Read/Write Register Long command. At step 1409, the 8-bit argument field 1509E is set to hexadecimal C6 (binary 11000110). At step 1411, the 16-bit address field 1509F is either hexadecimal FFFF (for a group call ID or hostile environment, such as military operation or when ID suppression is desired) or the 16-bit unit ID. At step 1413, the CRC is calculated on all fields and placed in the 16-bit data CRC field 1509G.

A special use for a GIB is a radio check block, as shown in FIG. 15W. The GRB/GIB bit 1509A is set to 0, the ACK bit 1509B and DST/SRC bit 1509C are both set to 1, the op-code 1509D is set to 00011, the argument 1509E is set to binary 10000101 to designate radio check, and the address 1509F is the 16-bit address of the destination communication unit. A second special use for a GIB is a location acknowledgment for a radio check sequence, as shown in FIG. 15W. The GRB/GIB bit 1509A, the ACK bit 1509B, and the DST/SRC bit 1509C are all set to 0, the op-code 1509D is set to 00011, the argument 1509E is set to binary 00000000 to designate location acknowledgment for a radio check, and the address 1509F is the 16-bit address of the source communication unit.

Figure 15X:
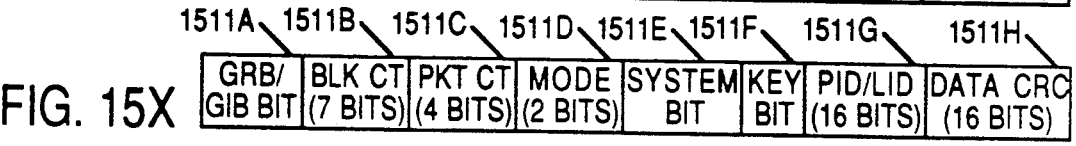
FIG. 15X is a bit field representation of a general register block in accordance with the invention.

FIG. 15X is a bit field representation of a general register block 1511. Formation of a GRB 1511 includes those steps within a second dashed block 1433. At step 1417, the GRB/GIB bit 1511A is always set to 1. At step 1419, the 7-bit block count (BLK CT) field 1511B is set to the number of blocks (a block is comprised of 6 bytes) that follow the GRB 1511. At step 1421, the 4-bit packet count (PKT CT) 1511C is set to the number packets in the current rekeying sequence. At step 1423, the 2-bit encrypt mode field 1511D is set to 00 if unencrypted or 01 if encrypted.

At step 1425, the system bit 1511E is set to 0, for the type of system. At step 1427, the key bit 1511F is set to 0 if a physical ID is specified or 1 if a logical ID is specified. At step 1429, the PID/LID field 1511G contains the storage location of the encryption key for this message. At step 1431, the CRC is calculated on all fields and placed in the 16-bit data CRC field 1511H.

Note that FIG. 15 is not drawn to scale. Blocks numbered with the same number do not necessarily contain the same bits, but do contain the same number of bits which are defined the same way for similarly numbered blocks.

Figure 16:
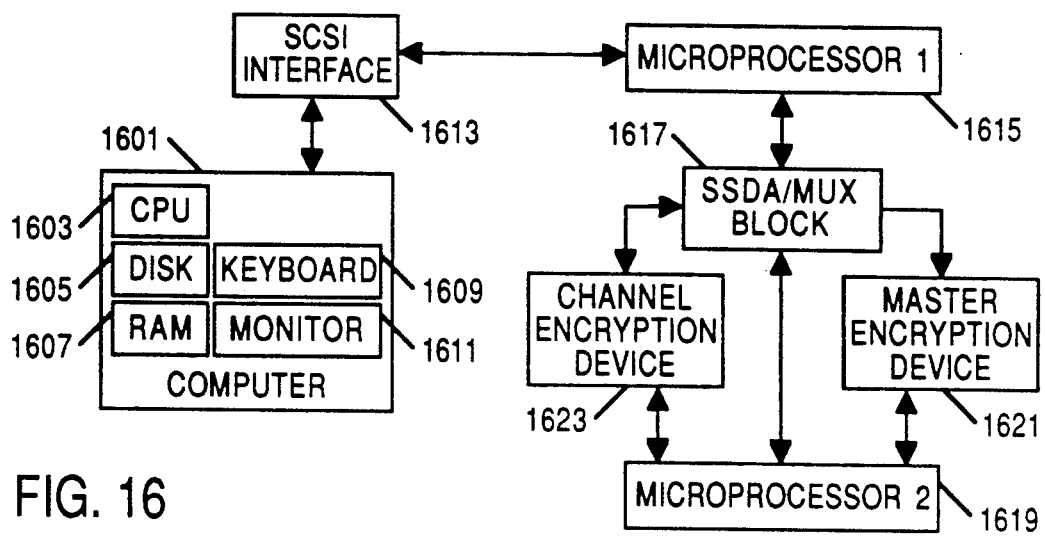
FIG. 16 is a block diagram of a KMC in accordance with the invention.

FIG. 16 is a block diagram of a KMC 101. The basic part of the KMC is a 68030-based computer 1601 containing a CPU 1603, storage disk 1605, RAM 1607, a keyboard 1609 for entering commands externally, and a monitor 1611 to output data. An example of such a computer is a VME 3400 computer, available from Motorola, Inc. Additional hardware is attached to the computer to provide encryption for data as needed. This hardware is attached through an SCSI (Small Computer System Interface) block 1613, as is known in the art. A first microprocessor 1615, such as an MC68HC11 microprocessor available from Motorola, Inc., passes encrypted and unencrypted data between the computer 1601 and SSDA/MUX (Synchronous Serial Data Adaptor/Multiplexor) block 1617, which performs serial data transfer and multiplex functions to transfer data from a second microprocessor 1619, such as an MC68HC11 microprocessor available from Motorola, Inc., to the first microprocessor 1615. A master encryption device 1621 provides encryption for data to be stored locally in the KMC and a channel encryption device 1623 for encrypting/decrypting data which is transferred over the channel.

In order to prevent an unauthorized person from sending a rekeying message with keys known to him for purposes of intercepting sensitive messages, the following method of message authentication is used. FIG. 17 is a flowchart showing rekeying message authentication in accordance with the invention. At step 1701, the rekeying message is received. At step 1703, the message number 1517A of the previous message is stored as the previous message number. At step 1705, the message number 1517A of the current message is stored as the current message number. At step 1707, the value of the current message number is compared to the value of the previous message number (not taking into account the 2 sequence bits within the message number field). If the current message number is greater than or equal to the previous message number, the message is accepted and an ACK is sent at step 1709. Because the KMC numbers each successive message it sends in chronological order, a message sent in time after an earlier message will contain a higher message number. This also prevents someone from intercepting a prior message, determining its code, and resending a compromised rekeying message. If the current message number is less than the previous message number, the message is not accepted and a NACK is sent at step 1711. For a more secure system, an accepted message can be further restricted to either one with a specific expected message number or a message number within one or two message numbers of the previous message.

What is claimed is:

1. A method of rekeying at least one communication unit in a communication system, comprising the steps of:
   generating an acknowledgment field;
   loading a message number field;
   setting a destination/source field;
   setting an operation-code field;
   determining an address field;
   forming a rekeying message comprising said acknowledgment field, said message number field, said destination/source field, said operation-code field, and said address field; and
   transmitting said rekeying message to the at least one communication unit.

2. The method of rekeying of claim 1, further comprising the step of encrypting any of said acknowledgment field, said message number field, said destination/source field, said operation-code field, and said address field.

3. The method of rekeying of claim 1 further comprising the steps of;
   generating a synchronization field; and
   incorporating said synchronization field into said rekeying message.

4. The method of rekeying of claim 1 further comprising the steps of;
   setting a key identification field; and
   incorporating said key identification field into said rekeying message.

5. The method of rekeying of claim 1, further comprising the steps of:
   forming a key identification block;
   generating a key field; and
   incorporating said key identification block and said key field into said rekeying message.

6. The method of rekeying of claim 1, further comprising the steps of;
   forming an index identification block; and
   incorporating said index identification block into said rekeying message.

7. The method of rekeying of claim 6, further comprising the steps of:
   generating an index name field; and
   incorporating said index name field into said rekeying message.

8. The method of rekeying of claim 1, further comprising the steps of:
   forming a zeroization identification block; and
   incorporating said zeroization identification block into said rekeying message.

9. The method of rekeying of claim 1, further comprising the steps of:
   generating a data packet; and
   incorporating said data packet into said rekeying message.

10. The method of rekeying of claim 1, further comprising the steps of:
    generating an initialization vector field; and
    incorporating said initialization vector field into said rekeying message.

11. The method of rekeying of claim 1, further comprising the steps of:
    generating a security test data field; and
    incorporating said security test data field into said rekeying message.

12. The method of rekeying of claim 1, further comprising the steps of:
    forming a map identification block; and
    incorporating said map identification block into said rekeying message.

13. The method of rekeying of claim 1, wherein said rekey packet further comprising the steps of:
    determining a previous message number field; and
    incorporating said previous message number field into said rekeying message.

14. The method of rekeying of claim 1, wherein said rekey packet further comprising the steps of:
    generating keyloader upload data; and
    incorporating said keyloader upload data into said rekeying message.

15. A key management controller for use in a communication system with rekeying at least one communication unit, comprising:
    means for generating an acknowledgment field;
    means for loading a message number field;
    means for setting a destination/source field;
    means for setting an operation-code field;
    means for determining an address field;
    means for forming a rekeying message comprised of said acknowledgment field, said message number field, said destination/source field, said operation-code field, and said address field; and
    means, coupled to said means for forming, for sending said rekeying message to the at least one communication unit.

16. The key management controller of claim 15, further comprising means for encrypting any of said acknowledgment field, said message number field, said destination/source field, said operation-code field, and said address field.

17. The key management controller of claim 15, further comprising:
    means for generating a synchronization field; and
    means, coupled to said means for forming, for incorporating said synchronization field into said rekeying message.

18. The key management controller of claim 15, further comprising:
    means for setting a key identification field; and
    means, coupled to said means for forming, for incorporating said key identification field into said rekeying message.

19. The key management controller of claim 15, further comprising:
    means for forming a key identification block;
    means for generating a key field; and
    means, coupled to said means for forming a rekeying message, for incorporating said key identification block and said key field into said rekeying message.

20. The key management controller of claim 15, further comprising:
    means for forming an index identification block; and
    means, coupled to said means for forming a rekeying message, for incorporating said index identification block into said rekeying message.

21. The key management controller of claim 20, further comprising:
    means for generating an index name field; and
    means, coupled to said means for forming, for incorporating said index name field into said rekeying message.

22. The key management controller of claim 15, further comprising:

means for forming a zeroization identification block; and means, coupled to said means for forming a rekeying message, for incorporating said zeroization identification block into said rekeying message.

23. The key management controller of claim 15, further comprising:
   means for generating a data packet; and
   means, coupled to said means for forming, for incorporating said data packet into said rekeying message.

24. The key management controller of claim 15, further comprising:
   means for generating an initialization vector field; and
   means, coupled to said means for forming, for incorporating said initialization vector field into said rekeying message.

25. The key management controller of claim 15, further comprising:
   means for generating a security test data field; and
   means, coupled to said means for forming, for incorporating said security test data field into said rekeying message.

26. The key management controller of claim 15, further comprising:
   means for forming a map identification block; and
   means, coupled to said means for forming a rekeying message, for incorporating said map identification block into said rekeying message.

27. The key management controller of claim 15, further comprising:
   means for determining a previous message number field; and
   means, coupled to said means for forming, for incorporating said previous message number field into said rekeying message.

28. The key management controller of claim 15, further comprising:
   means for generating keyloader upload data; and
   means, coupled to said means for forming, for incorporating said keyloader upload data into said rekeying message.

29. A communication unit for use in a communication system with rekeying of at least one communication unit by a key management controller, comprising:
   means for generating an acknowledgment field;
   means for loading a message number field;
   means for setting a destination/source field;
   means for setting an operation-code field;
   means for determining an address field;
   means for generating a rekey request packet;
   means for forming a rekey request message comprised of said acknowledgment field, said message number field, said destination/source field, said operation-code field, said address field, and said rekey request packet; and
   means, coupled to said means for forming, for sending said rekey request message to the key management controller.

30. A communication unit for use in a communication system with rekeying of at least one communication unit by a key management controller, comprising:
   means for generating an acknowledgment field;
   means for loading a message number field;
   means for setting a destination/source field;
   means for setting an operation-code field;
   means for determining an address field;
   means for generating an acknowledgment packet;
   means for forming an acknowledgment message comprised of said acknowledgment field, said message number field, said destination/source field, said operation-code field, said address field, and said acknowledgment packet; and
   means, coupled to said means for forming, for sending said acknowledgment message to the key management controller.

* * * * *